US011954000B2

(12) United States Patent
Mittal et al.

(10) Patent No.: US 11,954,000 B2
(45) Date of Patent: Apr. 9, 2024

(54) EFFICIENT FILE RECOVERY FROM TIERED CLOUD SNAPSHOTS

(71) Applicant: Rubrik, Inc., Palo Alto, CA (US)

(72) Inventors: Anuj Mittal, Mathura (IN); Dhananjay Mantri, Mountain View, CA (US); Shivanshu Agrawal, Seattle, WA (US); Gaurav Maheshwari, Jaipur (IN)

(73) Assignee: Rubrik, Inc., Palo Alto, CA (US)

( * ) Notice: Subject to any disclaimer, the term of this patent is extended or adjusted under 35 U.S.C. 154(b) by 0 days.

(21) Appl. No.: 17/714,408

(22) Filed: Apr. 6, 2022

(65) Prior Publication Data

US 2023/0325286 A1 Oct. 12, 2023

(51) Int. Cl.
*G06F 11/00* (2006.01)
*G06F 11/14* (2006.01)
*G06F 16/11* (2019.01)
*G06F 16/188* (2019.01)

(52) U.S. Cl.
CPC ...... *G06F 11/1469* (2013.01); *G06F 11/1471* (2013.01); *G06F 16/128* (2019.01); *G06F 16/188* (2019.01)

(58) Field of Classification Search
CPC ............. G06F 11/1435; G06F 11/1448; G06F 11/1451; G06F 11/1469; G06F 11/1484
See application file for complete search history.

(56) References Cited

U.S. PATENT DOCUMENTS

| | | | |
|---|---|---|---|
| 11,068,353 B1 * | 7/2021 | Ved | G06F 9/45558 |
| 2016/0132410 A1 * | 5/2016 | Yu | G06F 11/1469 |
| | | | 714/6.11 |
| 2022/0138051 A1 * | 5/2022 | Yelheri | G06F 11/1469 |
| | | | 711/162 |
| 2022/0253253 A1 * | 8/2022 | Bonner | G06F 3/0614 |

OTHER PUBLICATIONS

Rajgarhia et al., "Performance and Extension of User Space File Systems", SAC '10, Mar. 22-26, 2010, pp. 206-213 (Year: 2010).*

* cited by examiner

*Primary Examiner* — Michael Maskulinski
(74) *Attorney, Agent, or Firm* — Holland & Hart LLP

(57) ABSTRACT

A file system in a user space partition of virtual memory may be mounted by a computing device that runs a virtual machine which includes a set of storage disks. The file system in user space may then expose one or more virtual files associated with one or more storage disks that correspond to one or more loop devices configured to map files of the virtual machine to the one or more virtual files. The computing device may then receive a request to read a data block stored at the virtual machine and may identify a file and corresponding virtual file that stores the requested data block based on a set of metadata provided by the loop devices. The computing device may then determine the location of the data block stored at the virtual machine, and may read the data block from the determined location.

19 Claims, 13 Drawing Sheets

EFFICIENT FILE RECOVERY FROM TIERED CLOUD SNAPSHOTS

FIELD OF TECHNOLOGY

The present disclosure relates generally to database systems and data processing, and more specifically to efficient file recovery from tiered cloud snapshots.

BACKGROUND

A computing system may be employed to manage, process, backup, and restore data using a network of computing devices. In some examples, backup data may be stored in a cloud computing environment that is configured for reduced storage cost. However, techniques used to access and recover files from the cloud computing environment may be time and computing resource intensive.

DETAILED DESCRIPTION

Figure 1:
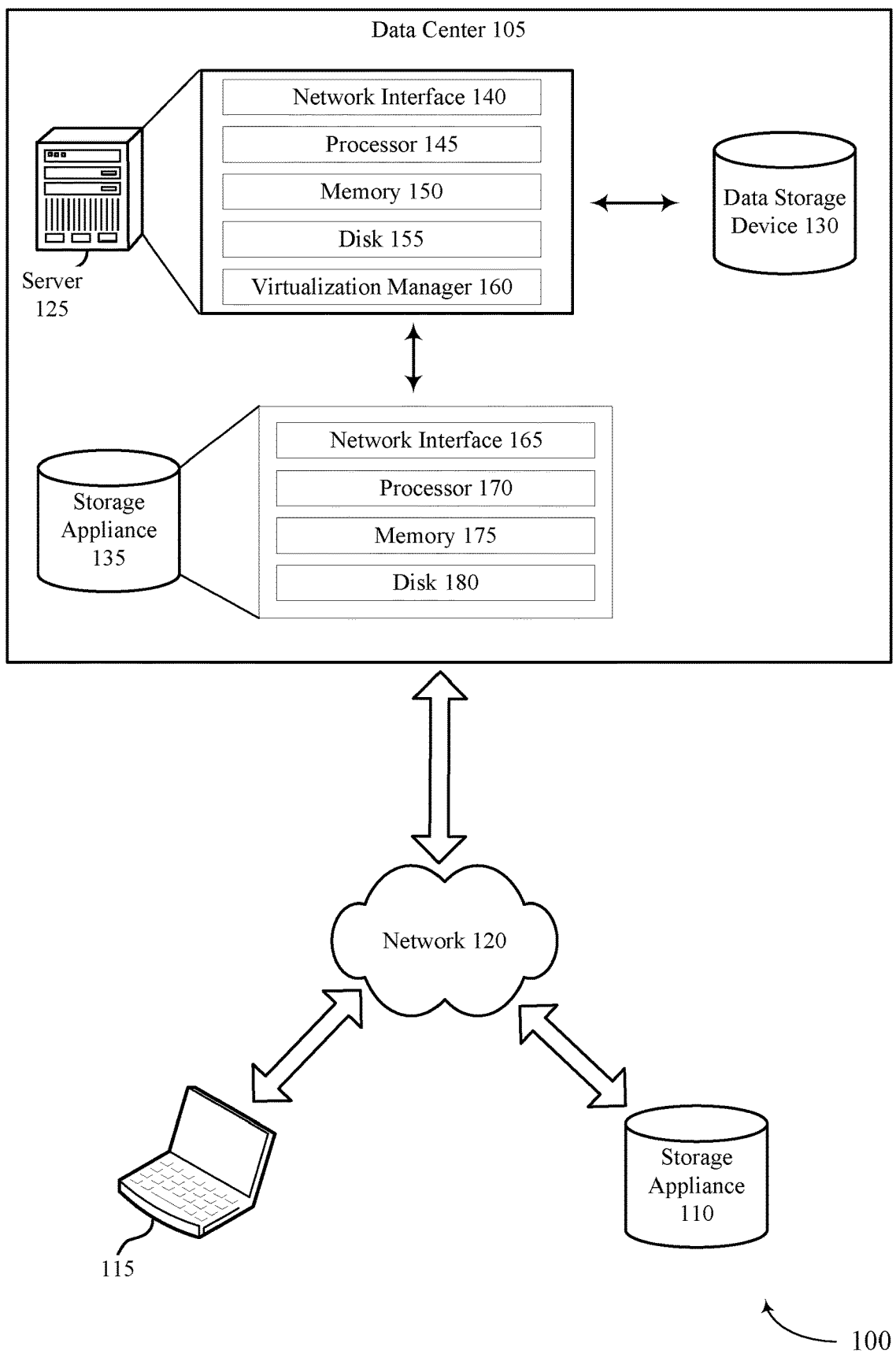
FIG. 1 illustrates an example of a computing environment that supports efficient file recovery from tiered cloud snapshots in accordance with aspects of the present disclosure.

A virtual machine (VM) environment may include a number of disks that store application data or other kinds of file storage data. To facilitate data recovery and backup of data on the VM, a system may store a number of snapshots of the data stored on disks, which may be used as a safe point where the VM can rollback to before patches or upgrades, for single file recovery, or for recovering data after corruption or ransomware attacks. In some examples, backing up a VM may require taking a large number of snapshots, with some snapshots being stored in a primary cloud storage environment (e.g., a first tier of cloud storage), and some other snapshots being stored in a secondary cloud storage environment to save cost (e.g., a second tier of cloud storage that is cheaper but may have slower read or write capabilities). File recovery from tiered cloud storage may involve recovering a full snapshot (which may include recovering multiple full backups and incremental backups off of multiple disks), and then performing granular file recovery on the full recovered snapshot in order to access certain files of interest. Performing full recovery for a full snapshot and then granular recovery, however, can be relatively inefficient since the full snapshot includes a number of extra files in addition to the files of interest.

To increase the efficiency of file access and recovery for files stored in a virtual machine, a system may implement a userspace filesystem (e.g., a FUSE system) to expose disk backups in cloud storage as virtual files. A FUSE system may be an example of a file system that is in a user space partition of virtual memory of a computing device. Exposure of virtual files via the FUSE system may optimize granular file recovery without first needing to perform a full recovery. Specifically, the FUSE system may implement a software interface that allows creation of file systems by running file system code in user space to expose virtual files for disks of the VM. The FUSE system may be used to detect and mount the filesystems present in each disk of the VM, which enables visibility and access to specific files on each disk.

Upon receiving a request to read or access a file, the mounted filesystem fetches filesystem metadata blocks from loop devices that correspond to each exposed virtual file for each disk. These loop devices may be examples of pseudo-devices that make files accessible within the mounted filesystem and can fetch metadata (e.g., timestamps of file creation and access, general file information) which may further allow for faster identification and access to the requested file. Any request to read data blocks from the loop devices is translated to a read from the underlying virtual file as part of the FUSE filesystem. The request to read the requested data block is then passed to the running FUSE process, which determines the last backup of the requested file and then reads and returns the specific backup file. The techniques described herein may allow for more efficient granular file access without a need for downloading large quantities of data or full snapshots, which may be lengthy and generally resource intensive.

Aspects of the disclosure are initially described in the context of an environment supporting an on-demand database service. Aspects of the disclosure are further illustrated by and described with reference to apparatus diagrams, system diagrams, data storage environments, a process flow, and flowcharts that relate to efficient file recovery from tiered cloud snapshots.

FIG. 1 illustrates an example of a computing environment 100 for cloud computing that supports efficient file recovery from tiered cloud snapshots in accordance with various aspects of the present disclosure. The computing environment 100 may include a data center 105, a storage appliance 110, and a computing device 115 in communication with each other via one or more networks 120. The computing environment 100 may also include one or more computing devices interconnected through one or more networks 120. The one or more networks 120 may allow computing devices or storage devices to connect to and communicate with other computing devices or other storage devices. In some examples, the computing environment 100 may include other computing devices or other storage devices not shown. The other computing devices may include, for example, a mobile computing device, a non-mobile computing device, a server, a workstation, a laptop computer, a tablet computer, a desktop computer, or an information processing system. The other storage devices may include, for example, a storage area network storage device, a networked-attached storage device, a hard disk drive, a solid-state drive, or a data storage system.

The data center 105 may include one or more servers, such as server 125, in communication with one or more storage devices, such as storage device 130. The one or more servers may also be in communication with one or more storage appliances, such as storage appliance 135. The server 125, storage device 130, and storage appliance 135 may be in communication with each other via a networking fabric connecting servers and data storage units within the data center 105 to each other. The storage appliance 135 may include a data management system for backing up virtual machines or files within a virtualized infrastructure. The server 125 may be used to create and manage one or more virtual machines associated with a virtualized infrastructure, one or more databases (e.g., the server 125 may include a database management system for a database), or any combination thereof.

The one or more virtual machines may run various applications, such as a database application or a web server. The storage device 130 may include one or more hardware storage devices for storing data, such as a hard disk drive (HDD), a magnetic tape drive, a solid-state drive (SSD), a storage area network (SAN) storage device, or a Network-Attached Storage (NAS) device. In some cases, the data storage device 130 may store structured data as part of a database (e.g., a database for which the server 125 implements a database management system) In some cases, a data center, such as data center 105, may include multiple servers and/or data storage devices in communication with each other. The one or more data storage devices 130 may comprise a tiered data storage infrastructure (or a portion of a tiered data storage infrastructure). The tiered data storage infrastructure may allow for the movement of data across different tiers of a data storage infrastructure between higher-cost, higher-performance storage devices (e.g., solid-state drives and hard disk drives) and relatively lower-cost, lower-performance storage devices (e.g., magnetic tape drives).

The one or more networks 120 may include a secure network such as an enterprise private network, an unsecure network such as a wireless open network, a local area network (LAN), a wide area network (WAN), and the Internet. The one or more networks 120 may include a cellular network, a mobile network, a wireless network, or a wired network. Each network of the one or more networks 120 may include hubs, bridges, routers, switches, and wired transmission media such as a direct-wired connection. The one or more networks 120 may include an extranet or other private network for securely sharing information or providing controlled access to applications or files.

A server, such as server 125, may allow a client to download information or files (e.g., executable, text, application, audio, image, or video files) from the server 125 or to perform a search query related to particular information stored on the server 125. In some examples, a server may act as an application server or a file server. In general, server 125 may refer to a hardware device that acts as the host in a client-server relationship or a software process that shares a resource with or performs work for one or more clients.

One example of server 125 includes a network interface 140, processor 145, memory 150, disk 155, and virtualization manager 160 all in communication with each other. Network interface 140 allows server 125 to connect to one or more networks 120. Network interface 140 may include a wireless network interface and/or a wired network interface. Processor 145 allows server 125 to execute computer-readable instructions stored in memory 150 in order to perform processes described herein. Processor 145 may include one or more processing units, such as one or more CPUs and/or one or more GPUs. Memory 150 may comprise one or more types of memory (e.g., random access memory (RAM), static-RAM (SRAM), dynamic-RAM (DRAM), read-only memory (ROM), electric erasable programmable ROM (EEPROM), Flash, etc.). Disk 155 may include a hard disk drive and/or a solid-state drive. Memory 150 and disk 155 may comprise hardware storage devices.

The virtualization manager 160 may manage a virtualized infrastructure and perform management operations associated with the virtualized infrastructure. The virtualization manager 160 may manage the provisioning of virtual machines running within the virtualized infrastructure and provide an interface to computing devices interacting with the virtualized infrastructure. In one example, the virtualization manager 160 may set a virtual machine having a virtual disk into a frozen state in response to a snapshot request made via an application programming interface (API) by a storage appliance, such as storage appliance 135. Setting the virtual machine into a frozen state may allow a point in time snapshot of the virtual machine to be stored or transferred. In one example, updates made to a virtual machine that has been set into a frozen state may be written to a separate file (e.g., an update file) while the virtual disk may be set into a read-only state to prevent modifications to the virtual disk file while the virtual machine is in the frozen state.

The virtualization manager 160 may then transfer data associated with the virtual machine (e.g., an image of the virtual machine or a portion of the image of the virtual disk file associated with the state of the virtual disk at the point in time it is frozen) to a storage appliance (for example, a storage appliance 135 or storage appliance 110 of FIG. 1, described further below) in response to a request made by the storage appliance. After the data associated with the point in time snapshot of the virtual machine has been transferred to the storage appliance 135, the virtual machine may be released from the frozen state (i.e., unfrozen) and the updates made to the virtual machine and stored in the separate file may be merged into the virtual disk file. The virtualization manager 160 may perform various virtual machine-related tasks, such as cloning virtual machines, creating new virtual machines, monitoring the state of virtual machines, moving virtual machines between physical hosts for load balancing purposes, and facilitating backups of virtual machines.

The storage appliance 135 may include a network interface 165, processor 170, memory 175, and disk 180 in communication with each other. Network interface 165 may support communication of storage appliance 135 with one or more networks. Network interface 165 may include a wireless network interface and/or a wired network interface. Processor 170 may support storage appliance in execution of computer-readable instructions stored in memory 175 to perform operations described herein. Processor 170 may include one or more processing units, such as one or more central processing units (CPUs) and/or one or more graphics processing units (GPUs). Memory 175 may comprise one or more types of memory as described with respect to memory 150. Disk 180 may include a hard disk drive and/or a solid-state drive. Memory 175 and disk 180 may comprise hardware storage devices.

The storage appliance 135 or storage appliance 110 may include multiple machines, and the multiple machines may comprise multiple nodes of a server cluster. The server cluster may comprise a set of physical machines that are connected together via a network. The server cluster may be used for storing data associated with a plurality of virtual machines, such as backup data associated with different point-in-time versions of the virtual machines.

The networked computing environment 100 may provide a cloud computing environment for one or more computing devices. Cloud computing may refer to Internet-based computing, wherein shared resources, software, and/or information may be provided to one or more computing devices on-demand via the Internet. The networked computing environment 100 may comprise a cloud computing environment providing Software-as-a-Service (SaaS) or Infrastructure-as-a-Service (IaaS) services. SaaS may refer to a software distribution model in which applications are hosted by a service provider and made available to end users over the Internet. In one example, the networked computing environment 100 may include a virtualized infrastructure that provides software, data processing, and/or data storage services to end users accessing the services via the networked computing environment 100. In one example, networked computing environment 100 may provide cloud-based work productivity or business-related applications to a computing device, such as computing device 115. The storage appliance 110 may comprise a cloud-based data management system for backing up virtual machines and/or files within a virtualized infrastructure, such as virtual machines running on server 125 or files stored on server 125.

In some examples, networked computing environment 100 may provide remote access to secure applications and files stored within data center 105 from a remote computing device, such as computing device 115. The data center 105 may use an access control application to manage remote access to protected resources, such as protected applications, databases, or files located within the data center 105. To facilitate remote access to secure applications and files, a secure network connection may be established using a virtual private network (VPN). A VPN connection may allow a remote computing device, such as computing device 115, to securely access data from a private network (e.g., from a company file server or mail server) using an unsecure public network or the Internet. The VPN connection may use client-side software (e.g., running on the remote computing device) to establish and maintain the VPN connection. The VPN client software may provide data encryption and encapsulation prior to the transmission of secure private network traffic through the Internet.

In some examples, the storage appliance 135 or storage appliance 110 may manage the extraction and storage of virtual machine snapshots associated with different point in time versions of one or more virtual machines running within the data center 105. A snapshot of a virtual machine may correspond with a state of the virtual machine at a particular point-in-time. In response to a restore command from the storage device 130, the storage appliance 135 may restore a point-in-time version of a virtual machine or restore point-in-time versions of one or more files located on the virtual machine and transmit the restored data to the server 125. In response to a mount command from the server 125, the storage appliance 135 may allow a point-in-time version of a virtual machine to be mounted and allow the server 125 to read and/or modify data associated with the point-in-time version of the virtual machine. To improve storage density, the storage appliance 135 may deduplicate and compress data associated with different versions of a virtual machine and/or deduplicate and compress data associated with different virtual machines. To improve system performance, the storage appliance 135 may first store virtual machine snapshots received from a virtualized environment in a cache, such as a flash-based cache. The cache may also store popular data or frequently accessed data (e.g., based on a history of virtual machine restorations, incremental files associated with commonly restored virtual machine versions) and current day incremental files or incremental files corresponding with snapshots captured within the past 24 hours.

An incremental file may comprise a forward incremental file or a reverse incremental file. A forward incremental file may include a set of data representing changes that have occurred since an earlier point-in-time snapshot of a virtual machine. To generate a snapshot of the virtual machine corresponding with a forward incremental file, the forward incremental file may be combined with an earlier point in time snapshot of the virtual machine (e.g., the forward incremental file may be combined with the last full image of the virtual machine that was captured before the forward incremental file was captured and any other forward incremental files that were captured subsequent to the last full image and prior to the forward incremental file). A reverse incremental file may include a set of data representing changes from a later point-in-time snapshot of a virtual machine. To generate a snapshot of the virtual machine corresponding with a reverse incremental file, the reverse incremental file may be combined with a later point-in-time snapshot of the virtual machine (e.g., the reverse incremental file may be combined with the most recent snapshot of the virtual machine and any other reverse incremental files that were captured prior to the most recent snapshot and subsequent to the reverse incremental file).

The storage appliance 135 or storage appliance 110 may provide a user interface (e.g., a web-based interface or a graphical user interface) that displays virtual machine backup information such as identifications of the virtual machines protected and the historical versions or time machine views for each of the virtual machines protected. A time machine view of a virtual machine may include snapshots of the virtual machine over a plurality of points in time. Each snapshot may comprise the state of the virtual machine at a particular point in time. Each snapshot may correspond with a different version of the virtual machine (e.g., Version 1 of a virtual machine may correspond with the state of the virtual machine at a first point in time and Version 2 of the virtual machine may correspond with the state of the virtual machine at a second point in time subsequent to the first point in time).

The user interface may enable an end user of the storage appliance 110 (e.g., a system administrator or a virtualization administrator) to select a particular version of a virtual machine to be restored or mounted. When a particular version of a virtual machine has been mounted, the particular version may be accessed by a client (e.g., a virtual machine, a physical machine, or a computing device) as if the particular version was local to the client. A mounted version of a virtual machine may correspond with a mount point directory (e.g., /snapshots/VM5Nersion23). In one example, the storage appliance 110 may run a Network File System (NFS) server and make the particular version (or a copy of the particular version) of the virtual machine accessible for reading and/or writing. The end user of the storage appliance 110 may then select the particular version to be mounted and run an application (e.g., a data analytics application) using the mounted version of the virtual machine. In another example, the particular version may be mounted as an Internet Small Computer Systems Interface (iSCSI) target.

As described herein, networked computing environment 100 may provide remote access to secure applications and files stored within data center 105 from a remote computing device, such as computing device 115. In addition, the storage appliance 135 or storage appliance 110 may provide a user interface (e.g., a web-based interface or a graphical user interface) that displays virtual machine backup information such as identifications of the virtual machines protected and the historical versions or time machine views for each of the virtual machines protected. A time machine view of a virtual machine may include snapshots of the virtual machine over a plurality of points in time. Each snapshot may comprise the state of the virtual machine at a particular point in time. Each snapshot may correspond with a different version of the virtual machine (e.g., Version 1 of a virtual machine may correspond with the state of the virtual machine at a first point in time and Version 2 of the virtual machine may correspond with the state of the virtual machine at a second point in time subsequent to the first point in time).

To increase the efficiency of granular file access and recovery for files stored in a virtual machine (e.g., as implemented and managed at a data storage device 130, a server 125, or any combination thereof), a system may implement a userspace filesystem (e.g., a FUSE system) to expose disk backups in cloud storage as virtual files. In some examples, the FUSE system may optimize granular file recovery without first needing to perform a full recovery to access a certain file located in a disk of a VM (e.g., located at the storage appliance 135, the storage appliance 110, or any combination thereof). Specifically, the FUSE system may implement a software interface that allows creation of file systems by running file system code in user space to expose virtual files for disks of the VM.

The FUSE system may be used to detect and mount the filesystems present in each disk of the VM, which enables visibility and access to specific files on each disk. Upon receiving a request to read or access a file, the mounted filesystem fetches filesystem metadata blocks from loop devices that correspond to each exposed virtual file for each disk. These loop devices are pseudo-devices that make files accessible within the mounted file system and can fetch metadata which may further allow for faster identification and access to the desired file. Any request to read data blocks from the loop devices is translated to a read from the underlying virtual file as part of the FUSE filesystem. The request to read the desired data block is then passed to the running FUSE process, which determines the last backup of the requested file and then reads and returns the specific backup file.

It is to be understood that one or more aspects of the disclosure may be implemented in a computing environment 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
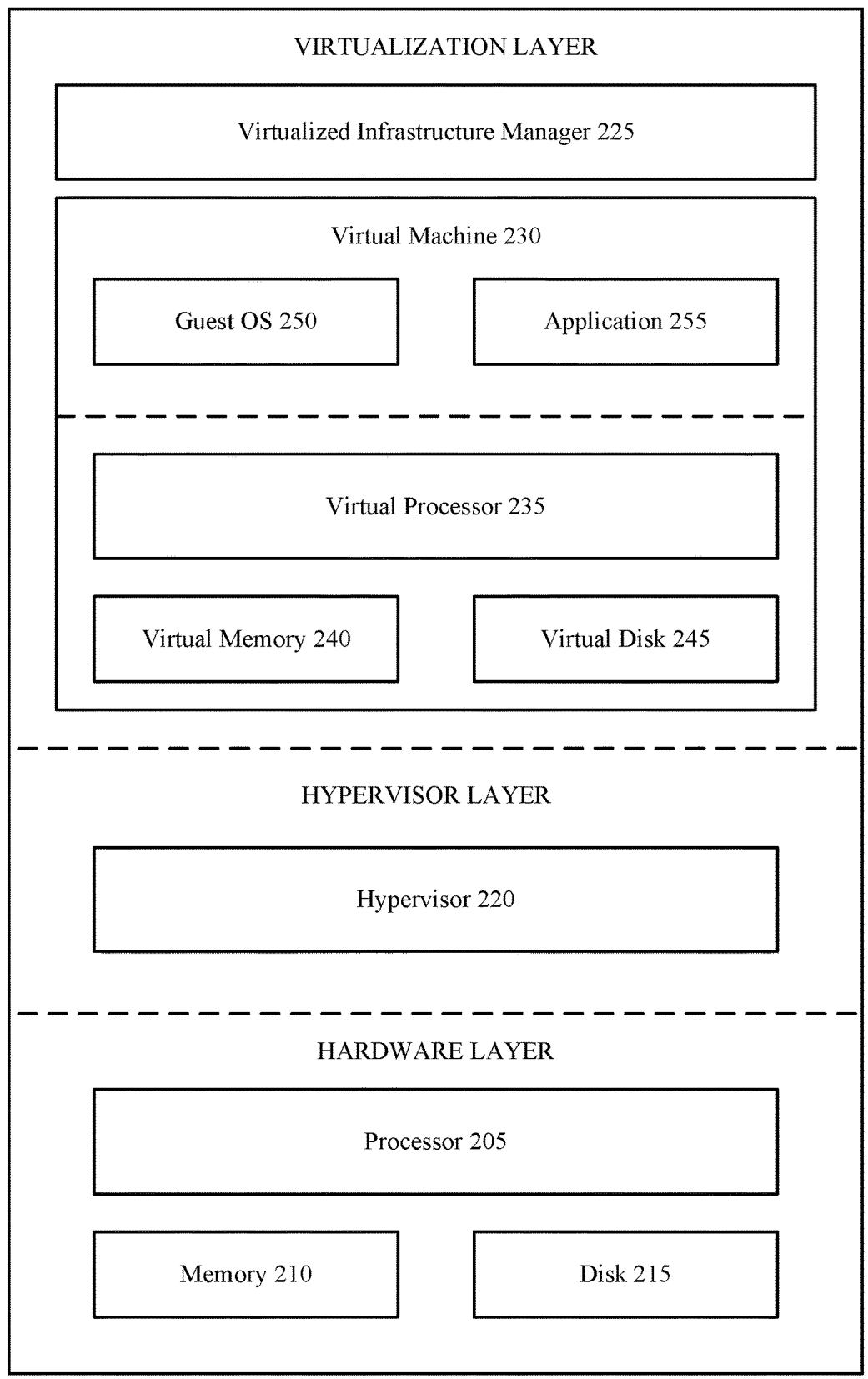
FIG. 2 illustrates an example of a server that supports efficient file recovery from tiered cloud snapshots in accordance with aspects of the present disclosure.

FIG. 2 illustrates an example of a server 200 that supports efficient file recovery from tiered cloud snapshots in accordance with aspects of the present disclosure. The server 200 may be an example of a server 125 described with reference to FIG. 1. The server 200 may include one server out of a plurality of servers that are networked together within a data center (e.g., data center 105 described with reference to FIG. 1). In one example, the plurality of servers may be positioned within one or more server racks within the data center. As depicted, the server 200 includes hardware-level components and software-level components. The hardware-level components include one or more processors 205, one or more memory 210, and one or more disks 215. The software-level components include a hypervisor 220, a virtualized infrastructure manager 225, and one or more virtual machines, such as virtual machine 230. The hypervisor 220 may include a native hypervisor or a hosted hypervisor. The hypervisor 220 may provide a virtual operating platform for running one or more virtual machines, such as virtual machine 230. Virtual machine 230 includes a plurality of virtual hardware devices including a virtual processor 235, a virtual memory 240, and a virtual disk 245. The virtual disk 245 may include a file stored within the one or more virtual disks 245. In one example, a virtual machine 230 may include a plurality of virtual disks 245, with each virtual disk of the plurality of virtual disks 245 associated with a different file stored on the one or more virtual disks 245. Virtual machine 230 may include a guest operating system 250 that runs one or more applications, such as application 255.

The virtualized infrastructure manager 225, which may be an example of the virtualization manager 160 described with reference to FIG. 1, may run on a virtual machine or natively on the server 200. The virtual machine may, for example, be or include the virtual machine 230 or a virtual machine separate from the server 200. Other arrangements are possible. The virtualized infrastructure manager 225 may provide a centralized platform for managing a virtualized infrastructure that includes a plurality of virtual machines. The virtualized infrastructure manager 225 may manage the provisioning of virtual machines running within the virtualized infrastructure and provide an interface to computing devices interacting with the virtualized infrastructure. The virtualized infrastructure manager 225 may perform various virtualized infrastructure related tasks, such as cloning virtual machines, creating new virtual machines, monitoring the state of virtual machines, and facilitating backups of virtual machines.

In an example, the server 200 may use the virtualized infrastructure manager 225 to facilitate backups for a plurality of virtual machines running on the server 200. One or more of the virtual machines running on the server 200 may run its own guest operating system and its own set of applications. Each virtual machine running on the server 200 may store its own set of files using one or more virtual disks associated with the virtual machine (e.g., each virtual machine may include two virtual disks that are used for storing data associated with the virtual machine).

In an example, a data management application running on a storage appliance, such as storage appliance 110 in FIG. 1 or storage appliance 135 in FIG. 1, may request a snapshot of a virtual machine running on server 200. The snapshot of the virtual machine may be stored as one or more files, with each file associated with a virtual disk of the virtual machine. A snapshot of a virtual machine may correspond with a state of the virtual machine at a particular point in time. The particular point in time may be associated with a time stamp. In one example, a first snapshot of a virtual machine may correspond with a first state of the virtual machine (including the state of applications and files stored on the virtual machine) at a first point in time and a second snapshot of the virtual machine may correspond with a second state of the virtual machine at a second point in time subsequent to the first point in time.

In response to a request for a snapshot of a virtual machine at a particular point in time, the virtualized infrastructure manager 225 may set the virtual machine into a frozen state or store a copy of the virtual machine at the particular point in time. The virtualized infrastructure manager 225 may then transfer data associated with the virtual machine (e.g., an image of the virtual machine or a portion of the image of the virtual machine) to the storage appliance 110 or storage appliance 135. The data associated with the virtual machine may include a set of files including a virtual disk file storing contents of a virtual disk of the virtual machine at the particular point in time and a virtual machine configuration file storing configuration settings for the virtual machine at the particular point in time. The contents of the virtual disk file may include the operating system used by the virtual machine, local applications stored on the virtual disk, and user files (e.g., images and word processing documents). In some cases, the virtualized infrastructure manager 225 may transfer a full image of the virtual machine to the storage appliance 110 or storage appliance 135 of FIG. 1 or a plurality of data blocks corresponding with the full image (e.g., to enable a full image-level backup of the virtual machine to be stored on the storage appliance). In other cases, the virtualized infrastructure manager 225 may transfer a portion of an image of the virtual machine associated with data that has changed since an earlier point in time prior to the particular point in time or since a last snapshot of the virtual machine was taken. In one example, the virtualized infrastructure manager 225 may transfer data associated with virtual blocks stored on a virtual disk of the virtual machine that have changed since the last snapshot of the virtual machine was taken. In one example, the data management application may specify a first point in time and a second point in time and the virtualized infrastructure manager 225 may output one or more virtual data blocks associated with the virtual machine that have been modified between the first point in time and the second point in time.

In some examples, the server 200 or the hypervisor 220 may communicate with a storage appliance, such as storage appliance 110 in FIG. 1 or storage appliance 135 in FIG. 1, using a distributed file system protocol such as NFS Version 3, or Server Message Block (SMB) protocol. The distributed file system protocol may allow the server 200 or the hypervisor 220 to access, read, write, or modify files stored on the storage appliance as if the files were locally stored on the server 200. The distributed file system protocol may allow the server 200 or the hypervisor 220 to mount a directory or a portion of a file system located within the storage appliance.

As described herein, in some cases, the server 200 may support efficient file recovery from tiered cloud snapshots. For example, the server 200 (e.g., one or more virtual machines implemented thereby) may serve as a filesystem controller as described herein, and may support or manage one or more filesystems and VMs described herein.

Figure 3:
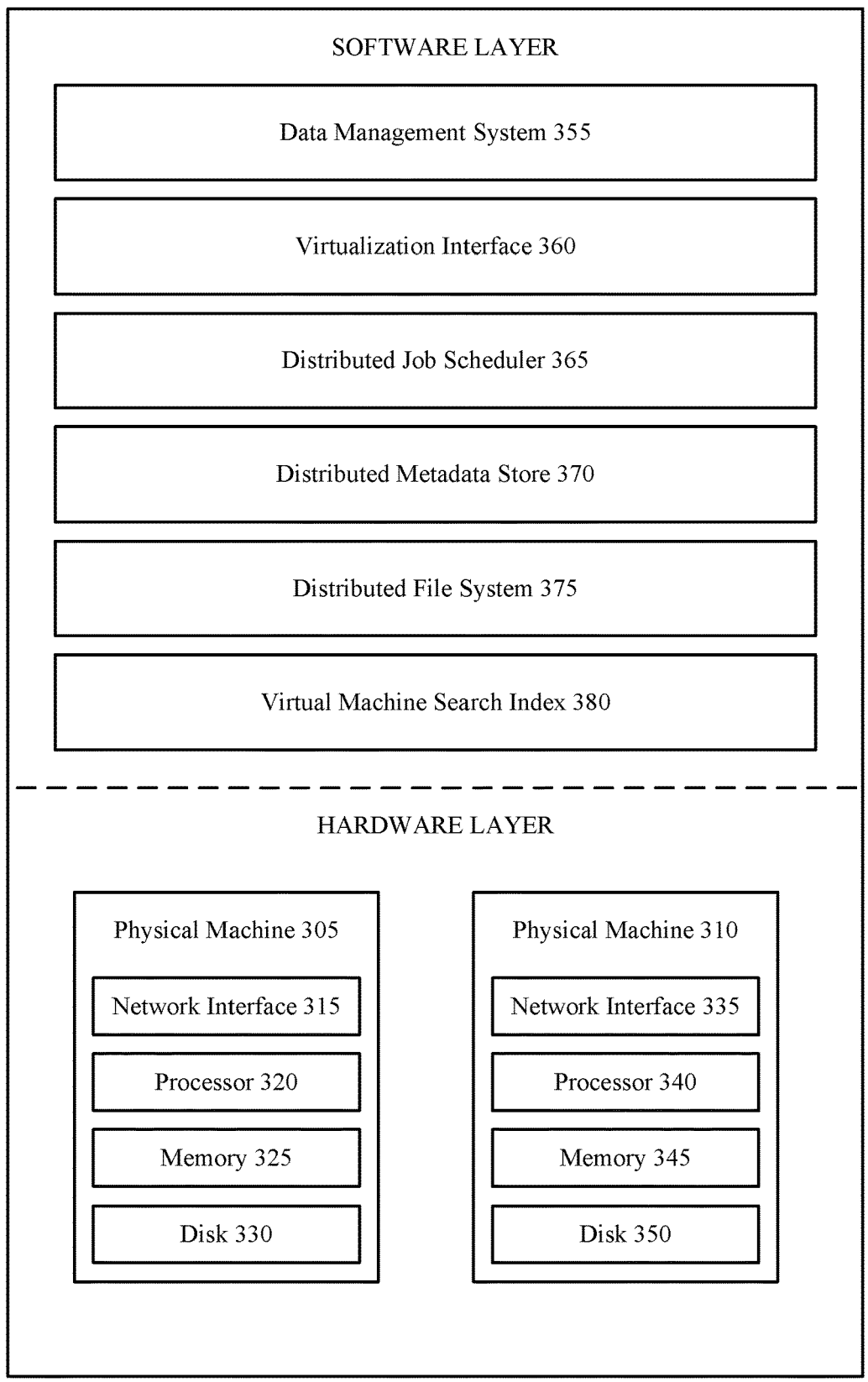
FIG. 3 illustrates an example of a storage appliance that supports efficient file recovery from tiered cloud snapshots in accordance with aspects of the present disclosure.

FIG. 3 illustrates an example of a storage appliance 300 that supports efficient file recovery from tiered cloud snapshots in accordance with aspects of the present disclosure. The storage appliance 300 may be an example of a storage appliance 110 or a storage appliance 135 as described with reference to FIG. 1. The storage appliance 300 may include a plurality of physical machines that may be grouped together and presented as a single computing system. One or more of the physical machines of the plurality of physical machines may comprise a node in a cluster. A cluster may be configured as a failover cluster for performing one or more failover operations as described herein. In one example, the storage appliance 300 may be positioned within a server rack within a data center, such as data center 105 as described with reference to FIG. 1. As depicted, the storage appliance 300 includes hardware-level components and software-level components. The hardware-level components include one or more physical machines, such as physical machine 305 and physical machine 310. The physical machine 305 includes a network interface 315, processor 320, memory 325, and disk 330 all in communication with each other. Processor 320 allows physical machine 305 to execute computer readable instructions stored in memory 325 to perform processes described herein. Disk 330 may include a hard disk drive and/or a solid-state drive. The physical machine 310 may include a network interface 335, processor 340, memory 345, and disk 350 all in communication with each other. Processor 340 allows physical machine 310 to execute computer readable instructions stored in memory 345 to perform processes described herein. Disk 350 may include a hard disk drive and/or a solid-state drive. In some examples, disk 350 may include a flash-based SSD or a hybrid HDD/SSD drive. In one example, the storage appliance 300 may include a plurality of physical machines arranged in a cluster. One or more of the plurality of physical machines may include a plurality of multi-core CPUs, RAM (e.g., 108 GB of RAM), SSD space (e.g., a 500 GB SSD), HDD space (e.g., four 4 TB HDDs), and a network interface controller.

In some examples, the plurality of physical machines may be used to implement a cluster-based network fileserver. The cluster-based network file server may neither require nor use a front-end load balancer. One issue with using a front-end load balancer to host the IP address for the cluster-based network file server and to forward requests to the nodes of the cluster-based network file server is that the front-end load balancer comprises a single point of failure for the cluster-based network file server. In some cases, the file system protocol used by a server, such as server 125 in FIG. 1, or a hypervisor, such as hypervisor 220 in FIG. 2, to communicate with the storage appliance 135 or storage appliance 110 may not provide a failover mechanism (e.g., NFS Version 3). In the case that no failover mechanism is provided on the client side, the hypervisor may not be able to connect to a new node within a cluster in the event that the node connected to the hypervisor fails.

In some examples, each node in a cluster may be connected to each other via a network and may be associated with one or more IP addresses (e.g., two different IP addresses may be assigned to each node). In one example, each node in the cluster may be assigned a permanent IP address and a floating IP address and may be accessed using either the permanent IP address or the floating IP address. In this case, a hypervisor, such as hypervisor 220 in FIG. 2, may be configured with a first floating IP address associated with a first node in the cluster. The hypervisor may connect to the cluster using the first floating IP address. In one example, the hypervisor may communicate with the cluster using a distributed file system protocol (e.g., NFS Version 3 protocol). One or more nodes in the cluster may run a Virtual Router Redundancy Protocol (VRRP) daemon. A daemon may include a background process. Each VRRP daemon may include a list of all floating IP addresses available within the cluster. In the event that the first node associated with the first floating IP address fails, one of the VRRP daemons may automatically assume or pick up the first floating IP address if no other VRRP daemon has already assumed the first floating IP address. Therefore, if the first node in the cluster fails or otherwise goes down, then one of the remaining VRRP daemons running on the other nodes in the cluster may assume the first floating IP address that is used by the hypervisor for communicating with the cluster.

In order to determine which of the other nodes in the cluster will assume the first floating IP address, a VRRP priority may be established. In one example, given a number (N) of nodes in a cluster from node(0) to node(N−1), for a floating IP address (i), the VRRP priority of node G may be G-i modulo N. In another example, given a number (N) of nodes in a cluster from node(0) to node(N−1), for a floating IP address (i), the VRRP priority of node G may be (i-j) modulo N. In these cases, node G will assume floating IP address (i) if its VRRP priority is higher than that of any other node in the cluster that is alive and announcing itself on the network. Thus, if a node fails, then there may be a clear priority ordering for determining which other node in the cluster will take over the failed node's floating IP address.

In some examples, a cluster may include a plurality of nodes and one or more nodes of the plurality of nodes may be assigned a different floating IP address. In such examples, a first hypervisor may be configured with a first floating IP address associated with a first node in the cluster, a second hypervisor may be configured with a second floating IP address associated with a second node in the cluster, and a third hypervisor may be configured with a third floating IP address associated with a third node in the cluster.

As depicted in FIG. 3, the software-level components of the storage appliance 300 may include data management system 355, a virtualization interface 360, a distributed job scheduler 365, a distributed metadata store 370, a distributed file system 375, and one or more virtual machine search indexes, such as virtual machine search index 380. In one example, the software-level components of the storage appliance 300 may be run using a dedicated hardware-based appliance. Additionally or alternatively, the software-level components of the storage appliance 300 may be run from the cloud (e.g., the software-level components may be installed on a cloud service provider).

In some examples, the data storage across a plurality of nodes in a cluster may be aggregated and made available over a single file system namespace (e.g., /snapshots/). For example, the data storage available from the one or more physical machines (e.g., physical machine 305 and physical machine 310) may be made available of a single file system namespace. A directory for each virtual machine protected using the storage appliance 300 may be created (e.g., the directory for Virtual Machine A may be/snapshots/VM_A). Snapshots and other data associated with a virtual machine may reside within the directory for the virtual machine. In one example, snapshots of a virtual machine may be stored in subdirectories of the directory (e.g., a first snapshot of Virtual Machine A may reside in /snapshots/VM_A/s1/and a second snapshot of Virtual Machine A may reside in /snapshots/VM_A/s2/).

The distributed file system 375 may present itself as a single file system, so that as new physical machines or nodes are added to the storage appliance 300, the cluster may automatically discover the additional nodes and automatically increase the available capacity of the file system for storing files and other data. Each file stored in the distributed file system 375 may be partitioned into one or more chunks or shards. Each of the one or more chunks may be stored within the distributed file system 375 as a separate file. The files stored within the distributed file system 375 may be replicated or mirrored over a plurality of physical machines, thereby creating a load-balanced and fault tolerant distributed file system. In one example, storage appliance 300 may include ten physical machines arranged as a failover cluster and a first file corresponding with a snapshot of a virtual machine (e.g., /snapshots/VM_A/s1/s1.full) may be replicated and stored on three of the ten machines.

The distributed metadata store 370 may include a distributed database management system that provides high availability without a single point of failure. In one example, the distributed metadata store 370 may comprise a database, such as a distributed document-oriented database. The distributed metadata store 370 may be used as a distributed key value storage system. In one example, the distributed metadata store 370 may include a distributed non-structured query language (NoSQL) key value store database. In some examples, the distributed metadata store 370 may include a partitioned row store, in which rows are organized into tables or other collections of related data held within a structured format within the key value store database. A table (or a set of tables) may be used to store metadata information associated with one or more files stored within the distributed file system 375. The metadata information may include the name of a file, a size of the file, file permissions associated with the file, when the file was last modified, and file mapping information associated with an identification of the location of the file stored within a cluster of physical machines. In one example, a new file corresponding with a snapshot of a virtual machine may be stored within the distributed file system 375 and metadata associated with the new file may be stored within the distributed metadata store 370. The distributed metadata store 370 may also be used to store a backup schedule for the virtual machine and a list of snapshots for the virtual machine that are stored using the storage appliance 300.

In some examples, the distributed metadata store 370 may be used to manage one or more versions of a virtual machine. Each version of the virtual machine may correspond with a full image snapshot of the virtual machine stored within the distributed file system 375 or an incremental snapshot of the virtual machine (e.g., a forward incremental or reverse incremental) stored within the distributed file system 375. In one example, the one or more versions of the virtual machine may correspond with a plurality of files. The plurality of files may include a single full image snapshot of the virtual machine and one or more incremental aspects derived from the single full image snapshot. The single full image snapshot of the virtual machine may be stored using a first storage device of a first type (e.g., a HDD) and the one or more incremental aspects derived from the single full image snapshot may be stored using a second storage device of a second type (e.g., an SSD). In this example, a single full image needs to be stored and each version of the virtual machine may be generated from the single full image or the single full image combined with a subset of the one or more incremental aspects. Further, each version of the virtual machine may be generated by performing a sequential read from the first storage device (e.g., reading a single file from a HDD) to acquire the full image and, in parallel, performing one or more reads from the second storage device (e.g., performing fast random reads from an SSD) to acquire the one or more incremental aspects.

The distributed job scheduler 365 may be used for scheduling backup jobs that acquire and store virtual machine snapshots for one or more virtual machines over time. The distributed job scheduler 365 may follow a backup schedule to back up an entire image of a virtual machine at a particular point in time or one or more virtual disks associated with the virtual machine at the particular point in time. In one example, the backup schedule may specify that the virtual machine be backed up at a snapshot capture frequency, such as every two hours or every 24 hours. A backup job may be associated with one or more tasks to be performed in a sequence. One or more tasks associated with a job may be run on a particular node within a cluster. In some cases, the distributed job scheduler 365 may schedule a specific job to be run on a particular node based on data stored on the particular node. For example, the distributed job scheduler 365 may schedule a virtual machine snapshot job to be run on a node in a cluster that is used to store snapshots of the virtual machine in order to reduce network congestion.

The distributed job scheduler 365 may comprise a distributed fault tolerant job scheduler, in which jobs affected by node failures are recovered and rescheduled to be run on available nodes. In one example, the distributed job scheduler 365 may be fully decentralized and implemented without the existence of a master node. The distributed job scheduler 365 may run job scheduling processes on each node in a cluster or on a plurality of nodes in the cluster. In one example, the distributed job scheduler 365 may run a first set of job scheduling processes on a first node in the cluster, a second set of job scheduling processes on a second node in the cluster, and a third set of job scheduling processes on a third node in the cluster. The first set of job scheduling processes, the second set of job scheduling processes, and the third set of job scheduling processes may store information regarding jobs, schedules, and the states of jobs using a metadata store, such as distributed metadata store 370. In the event that the first node running the first set of job scheduling processes fails (e.g., due to a network failure or a physical machine failure), the states of the jobs managed by the first set of job scheduling processes may fail to be updated within a threshold period of time (e.g., a job may fail to be completed within 30 seconds or within minutes from being started). In response to detecting jobs that have failed to be updated within the threshold period of time, the distributed job scheduler 365 may undo and restart the failed jobs on available nodes within the cluster.

The job scheduling processes running on at least a plurality of nodes in a cluster (e.g., on each available node in the cluster) may manage the scheduling and execution of a plurality of jobs. The job scheduling processes may include run processes for running jobs, cleanup processes for cleaning up failed tasks, and rollback processes for rolling-back or undoing any actions or tasks performed by failed jobs. In one example, the job scheduling processes may detect that a particular task for a particular job has failed and in response may perform a cleanup process to clean up or remove the effects of the particular task and then perform a rollback process that processes one or more completed tasks for the particular job in reverse order to undo the effects of the one or more completed tasks. Once the particular job with the failed task has been undone, the job scheduling processes may restart the particular job on an available node in the cluster.

The distributed job scheduler 365 may manage a job in which a series of tasks associated with the job are to be performed atomically (i.e., partial execution of the series of tasks is not permitted). If the series of tasks cannot be completely executed or there is any failure that occurs to one of the series of tasks during execution (e.g., a hard disk associated with a physical machine fails or a network connection to the physical machine fails), then the state of a data management system may be returned to a state as if none of the series of tasks were ever performed. The series of tasks may correspond with an ordering of tasks for the series of tasks and the distributed job scheduler 365 may ensure that each task of the series of tasks is executed based on the ordering of tasks. Tasks that do not have dependencies with each other may be executed in parallel.

In some examples, the distributed job scheduler 365 may schedule each task of a series of tasks to be performed on a specific node in a cluster. In other examples, the distributed job scheduler 365 may schedule a first task of the series of tasks to be performed on a first node in a cluster and a second task of the series of tasks to be performed on a second node in the cluster. In these examples, the first task may have to operate on a first set of data (e.g., a first file stored in a file system) stored on the first node and the second task may have to operate on a second set of data (e.g., metadata related to the first file that is stored in a database) stored on the second node. In some examples, one or more tasks associated with a job may have an affinity to a specific node in a cluster.

In one example, if the one or more tasks require access to a database that has been replicated on three nodes in a cluster, then the one or more tasks may be executed on one of the three nodes. In another example, if the one or more tasks require access to multiple chunks of data associated with a virtual disk that has been replicated over four nodes in a cluster, then the one or more tasks may be executed on one of the four nodes. Thus, the distributed job scheduler 365 may assign one or more tasks associated with a job to be executed on a particular node in a cluster based on the location of data required to be accessed by the one or more tasks.

In one example, the distributed job scheduler 365 may manage a first job associated with capturing and storing a snapshot of a virtual machine periodically (e.g., every 30 minutes). The first job may include one or more tasks, such as communicating with a virtualized infrastructure manager, such as the virtualized infrastructure manager 225 in FIG. 2, to create a frozen copy of the virtual machine and to transfer one or more chunks (or one or more files) associated with the frozen copy to a storage appliance, such as storage appliance 135 in FIG. 1. The one or more tasks may also include generating metadata for the one or more chunks, storing the metadata using the distributed metadata store 370, storing the one or more chunks within the distributed file system 375, and communicating with the virtualized infrastructure manager 225 that the frozen copy of the virtual machine may be unfrozen or released from a frozen state. The metadata for a first chunk of the one or more chunks may include information specifying a version of the virtual machine associated with the frozen copy, a time associated with the version (e.g., the snapshot of the virtual machine was taken at 5:30 p.m. on Jun. 29, 2018), and a file path to where the first chunk is stored within the distributed file system 375 (e.g., the first chunk is located at /snapshotsNM_B/s1/s1.chunk1). The one or more tasks may also include deduplication, compression (e.g., using a lossless data compression algorithm such as LZ4 or LZ77), decompression, encryption (e.g., using a symmetric key algorithm such as Triple DES or AES-256), and decryption related tasks.

The virtualization interface 360 may provide an interface for communicating with a virtualized infrastructure manager managing a virtualization infrastructure, such as virtualized infrastructure manager 225 in FIG. 2, and requesting data associated with virtual machine snapshots from the virtualization infrastructure. The virtualization interface 360 may communicate with the virtualized infrastructure manager using an API for accessing the virtualized infrastructure manager (e.g., to communicate a request for a snapshot of a virtual machine). In this case, storage appliance 300 may request and receive data from a virtualized infrastructure without requiring agent software to be installed or running on virtual machines within the virtualized infrastructure. The virtualization interface 360 may request data associated with virtual blocks stored on a virtual disk of the virtual machine that have changed since a last snapshot of the virtual machine was taken or since a specified prior point in time. Therefore, in some cases, if a snapshot of a virtual machine is the first snapshot taken of the virtual machine, then a full image of the virtual machine may be transferred to the storage appliance 300. However, if the snapshot of the virtual machine is not the first snapshot taken of the virtual machine, then the data blocks of the virtual machine that have changed since a prior snapshot was taken may be transferred to the storage appliance 300.

The virtual machine search index 380 may include a list of files that have been stored using a virtual machine and a version history for each of the files in the list. One or more version of a file may be mapped to the earliest point-in-time snapshot of the virtual machine that includes the version of the file or to a snapshot of the virtual machine that includes the version of the file (e.g., the latest point in time snapshot of the virtual machine that includes the version of the file). In one example, the virtual machine search index 380 may be used to identify a version of the virtual machine that includes a particular version of a file (e.g., a particular version of a database, a spreadsheet, or a word processing document). In some cases, each of the virtual machines that are backed up or protected using storage appliance 300 may have a corresponding virtual machine search index.

In one example, as each snapshot of a virtual machine is ingested, each virtual disk associated with the virtual machine is parsed in order to identify a file system type associated with the virtual disk and to extract metadata (e.g., file system metadata) for each file stored on the virtual disk. The metadata may include information for locating and retrieving each file from the virtual disk. The metadata may also include a name of a file, the size of the file, the last time at which the file was modified, and a content checksum for the file. Each file that has been added, deleted, or modified since a previous snapshot was captured may be determined using the metadata (e.g., by comparing the time at which a file was last modified with a time associated with the previous snapshot). Thus, for every file that has existed within any of the snapshots of the virtual machine, a virtual machine search index (e.g., virtual machine search index 380) may be used to identify when the file was first created (e.g., corresponding with a first version of the file) and at what times the file was modified (e.g., corresponding with subsequent versions of the file). Each version of the file may be mapped to a particular version of the virtual machine that stores that version of the file.

In some examples, if a virtual machine includes a plurality of virtual disks, then a virtual machine search index may be generated for each virtual disk of the plurality of virtual disks. For example, a first virtual machine search index may catalog, and map files located on a first virtual disk of the plurality of virtual disks and a second virtual machine search index may catalog and map files located on a second virtual disk of the plurality of virtual disks. In this case, a global file catalog or a global virtual machine search index for the virtual machine may include the first virtual machine search index and the second virtual machine search index. A global file catalog may be stored for each virtual machine backed up by a storage appliance within a file system, such as distributed file system 375 in FIG. 3.

The data management system 355 may comprise an application running on the storage appliance 300 that manages and stores one or more snapshots of a virtual machine. In one example, the data management system 355 may comprise a highest-level layer in an integrated software stack running on the storage appliance. The integrated software stack may include the data management system 355, the virtualization interface 360, the distributed job scheduler 365, the distributed metadata store 370, and the distributed file system 375.

In some examples, the integrated software stack may run on other computing devices, such as a server or computing device 115 in FIG. 1. The data management system 355 may use the virtualization interface 360, the distributed job scheduler 365, the distributed metadata store 370, and the distributed file system 375 to manage and store one or more snapshots of a virtual machine. One or more snapshots of the virtual machine may correspond with a point-in-time version of the virtual machine. The data management system 355 may generate and manage a list of versions for the virtual machine. One or more versions of the virtual machine may map to or reference one or more chunks and/or one or more files stored within the distributed file system 375. Combined together, the one or more chunks and/or the one or more files stored within the distributed file system 375 may comprise a full image of the version of the virtual machine.

As described herein, the storage appliance 300 or server 200 may support efficient file recovery from tiered cloud snapshots. For example, the server 200 (e.g., one or more virtual machines implemented thereby) may implement a filesystem controller as described herein, and the storage appliance 300 may store data (e.g., on a number of disks) as described herein.

Figure 4:
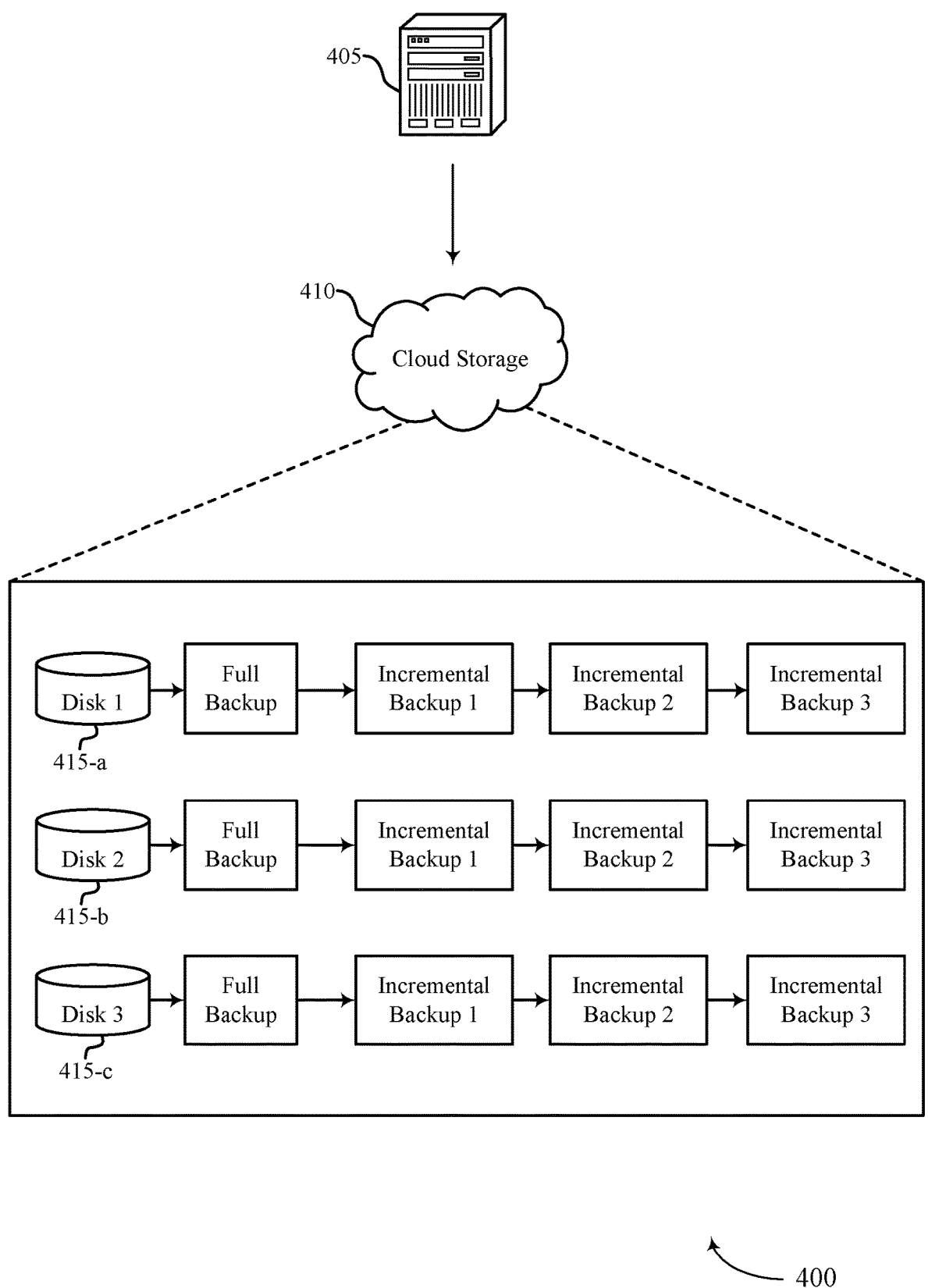
FIG. 4 illustrates an example of a data storage environment that supports efficient file recovery from tiered cloud snapshots in accordance with aspects of the present disclosure.

FIG. 4 illustrates an example of a data storage environment 400 that supports efficient file recovery from tiered cloud snapshots in accordance with aspects of the present disclosure. In some examples, various features of the data storage environment 400 may be implemented at or by a server 125, storage appliance 135, computing device 115, server 200, storage appliance 300, or any combination thereof as described with respect to FIGS. 1 through 3.

A VM 405 may store data on a number of disks (e.g., disk 1, disk 2, and disk 3), which are backed up periodically (e.g., after expiration of a set time period) to support the maintenance and security of the data. For example, the VM 405 described with reference to FIG. 4 includes three disks that are backed up on a daily basis, although other numbers of disks and other backup periodicities are possible. To store these backups in a cost effective manner, the VM 405 may store a full backup file per disk and then several incremental backup files (e.g., incremental backups 1, 2, and 3) in a secondary cloud storage 410, with a first backup stored as the full backup file and subsequent backups storing only the incremental backups (marking incremental changes or chains of incremental patch files) from a previous snapshot of the stored data.

In one example, a user may desire to recover a single file (e.g., a 1 MB size file) from the incremental backup 3 of the VM 405. In some cases, however, the user may first need to determine which disk (e.g., disk 1, disk 2, or disk 3) and which data blocks on the disk will have the desired file, because each disk may have multiple partitions and may be associated with potentially different filesystems of the VM 405. Additionally or alternatively, the workload may have complex abstractions on top of the filesystems such as a logical volume manager (LVM) and logical disk manager (LDM) systems which pool together the physical disks into logical volumes and extend storage beyond the physical disks.

To recover the desired file, in some examples, the user may recover each of the three disks (e.g., disk 1, disk 2 and disk 3) to create three recovered volumes, detect all the partitions on the recovered volumes, mount the filesystems present, and then read the desired file from the mount. In such examples, this process may require the user to download the full backup data from the cloud storage 410. For example, even if the user desires to recover a file of 1 kB from a 100 GB snapshot, the user may still need to download the full 100 GB snapshot to identify and access the 1 kB file, which may be computationally expensive and time-consuming.

To increase the efficiency and reduce cost for recovering desired files stored in the secondary cloud storage, in some examples, the user may implement techniques which include downloading relatively minimal data relative to the full download (e.g., downloading the size of the files recovered and a quantity of filesystem metadata). In addition, the time taken to download and recover a file from an archived snapshot may depend on the size of the file being downloaded, and not on the total size of the disk. Such techniques may implement a userspace filesystem (e.g., a FUSE system) to create a block device over files stored in the secondary cloud storage to expose disk backups in cloud storage as virtual files to optimize granular file recovery without needing to perform a full recovery. Specifically, the FUSE system is a software interface that allows creation of file systems by running file system code in user space to expose virtual files for every disk of the VM. The FUSE system is used to detect and mount the filesystems present in each disk of the VM, which enables visibility and access to specific files on each disk.

Upon receiving a request (e.g., a system call) to read or access a file, the request may be directed to a running FUSE process to read the data block at any offset from the requested file. For example, the request to read the desired data block is passed to the running FUSE process, which determines the last backup of the requested file (e.g., based on the last backup in which the data block was changed) and then reads and returns the specific backup file stored in the cloud storage. The techniques to read and recover files as described herein may reduce the amount of time and resources used to recover files, and may increase the overall efficiency for file access and download.

Figure 5:
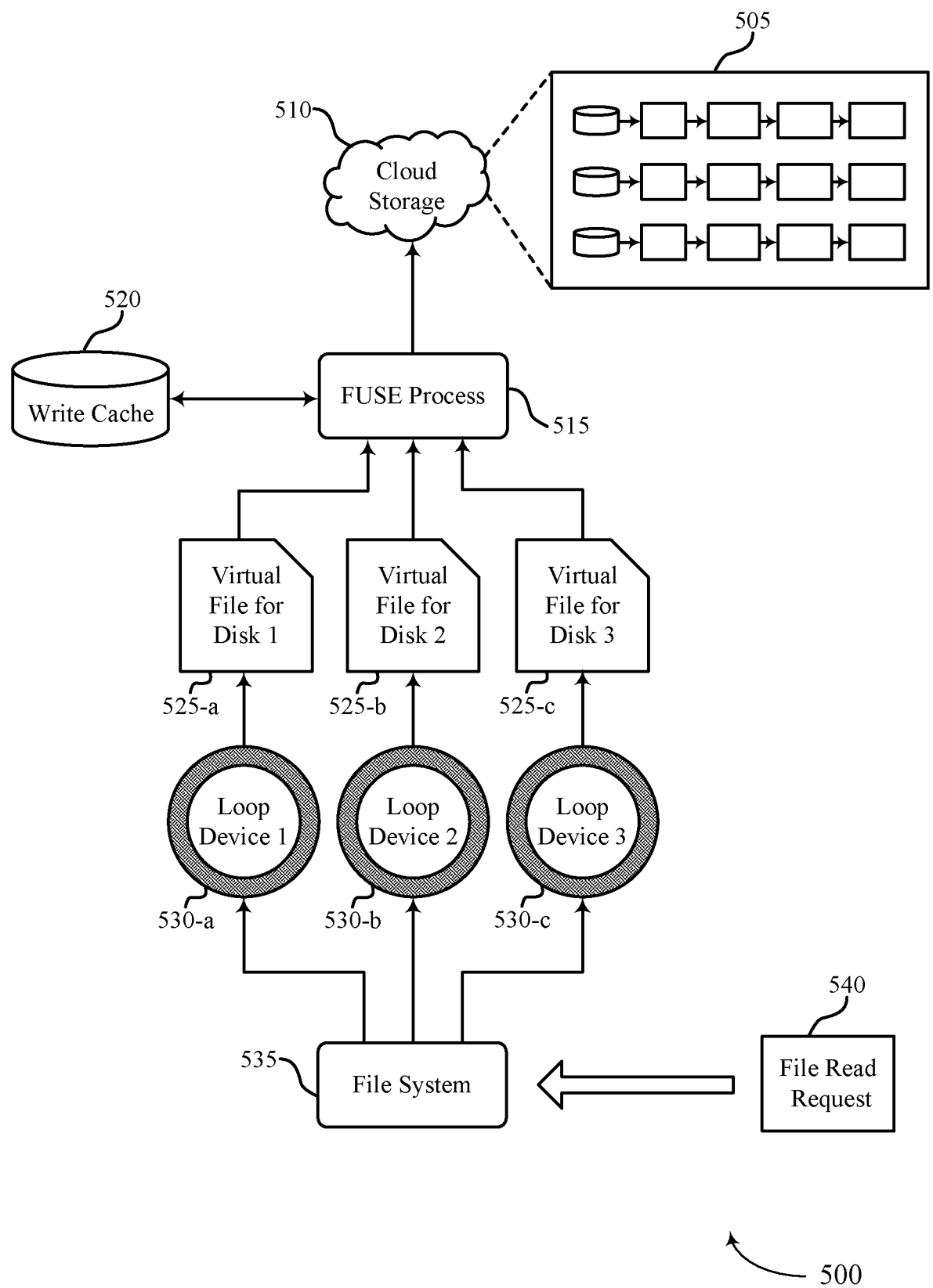
FIG. 5 illustrates an example of a data storage environment that supports efficient file recovery from tiered cloud snapshots in accordance with aspects of the present disclosure.

FIG. 5 illustrates an example of a data storage environment 500 that supports efficient file recovery from tiered cloud snapshots in accordance with aspects of the present disclosure. In some examples, various features of the data storage environment 500 may be implemented at or by a server 125, storage appliance 135, computing device 115, server 200, storage appliance 300, or any combination thereof as described with respect to FIGS. 1 through 3.

A VM environment 505 may include a number of disks that store application data or other kinds of file storage data. To facilitate data recovery and backup of data in the VM environment 505, a system may store a number of snapshots of the data stored on disks, which may be used as a safe point where the VM 505 can rollback to before patches or upgrades, or for single file recovery or quickly recovering against data corruption or ransomware attacks. In some cases, backing up a VM may require taking a large number of snapshots, with some snapshots being stored in a primary cloud storage environment (e.g., a first tier of storage), and some other snapshots being stored in a secondary cloud storage environment 510 (e.g., a second tier of storage) to save cost. In some cases, however, storing snapshots in the secondary cloud storage environment 510 may be associated with slower recovery speeds relative to recovery speeds for data stored in a primary cloud storage environment. For example, as described with reference to FIG. 4, file recovery from secondary cloud storage 510 may in some cases involve recovering a full snapshot (which may include recovering multiple full backups and incremental backups off of multiple disks), and then performing granular file recovery on the full recovered snapshot in order to access certain files of interest. Performing full recovery for a full snapshot, however, can be relatively inefficient because the full snapshot includes a number of extra files in addition to the files of interest. Therefore, to increase the efficiency of file recovery from the secondary cloud storage, some techniques may support granular or selective file recovery directly on the tiered snapshot without first performing a full recovery.

Some such techniques may implement a userspace filesystem 515 (e.g., a FUSE system 515) to create a block device over files stored in the secondary cloud storage 510 to expose disk backups in cloud storage as virtual files to optimize granular file recovery without performing a full recovery. Specifically, the FUSE system 515 is a software interface that allows creation of file systems by running file system code in user space to expose virtual files 525 for each disk of the VM (e.g., virtual file 525-*a* for disk 1, virtual file 525-*b* for disk 2, and virtual file 525-*c* for disk 3). The FUSE system 515 is used to detect and mount the filesystems present in each disk of the VM, which enables visibility and access to specific files on each disk.

The FUSE process 515 may be a software interface for Unix and Unix-like computer operating systems that lets non-privileged users create their own file systems without editing kernel code. This allows the user to write filesystem implementations which exposes the snapshots as files such that the read requests for those files are directed to the FUSE process 515 to identify the file. In some cases, the FUSE process 515 may be associated with a patch file server which exposes the file endpoint to read a block of data at a certain offset. In some examples, the FUSE process 515 may implement code which exposes data snapshots as disk-files in a directory to be read.

Upon receiving a request to read or access a file at 540, the mounted filesystem 535 fetches filesystem metadata blocks from loop devices 530 that correspond to each exposed virtual file for each disk (e.g., loop device 1 530-*a*, loop device 2 530-*b*, and loop device 3 530-*c*). These loop devices are pseudo-devices that make files accessible as a block device within the mounted file system, and any system may be able to interact with the loop devices as regular disks attached to the VM. The metadata blocks received from the loop devices may indicate times recorded by the operating system when the file system is created, modified, last accessed, etc., and may allow the system to determine which data blocks in the devices host the requested file. Any request to read data blocks from the loop devices (either metadata blocks or data blocks) is translated to a read from the underlying virtual file as part of the FUSE filesystem 515. The request to read the desired data block is then passed to the running FUSE process 515, which determines the last backup of the requested file (e.g., based on one or more backup markers or fingerprints) and then reads and returns the specific backup file stored in the secondary cloud storage 510.

Some filesystem operations, like mounting the virtual FUSE files, may also include writing of certain filesystem metadata blocks (e.g., in cases that the filesystem is not operating in read-only mode). In such cases, changes in data blocks may be written to the write cache 520 (in-memory or disk) since backup files may be read-only. For example, a read request received by the FUSE process may first go through the write cache 520 to see whether there are any past writes for the requested block. If there are no past writes, the system may read the files from the backup files as described herein. Additionally or alternatively, any received write request will write data to the cache 520.

The techniques described herein may allow a user to identify and access certain files for recovery located in a larger set of data stored in virtual disks of a VM in secondary cloud storage. The user may be able to access files without excess latency and additional cost introduced from downloading a full set of data in a snapshot. In addition, the techniques described herein may allow the user to read and browse through a snapshot for any analysis (e.g., in addition to or in place of data recovery) by fetching the data selectively. Additionally or alternatively, the techniques may allow the user to obtain a working copy of the backup data available as virtual disks without having to download a full data set up front.

Figure 6:
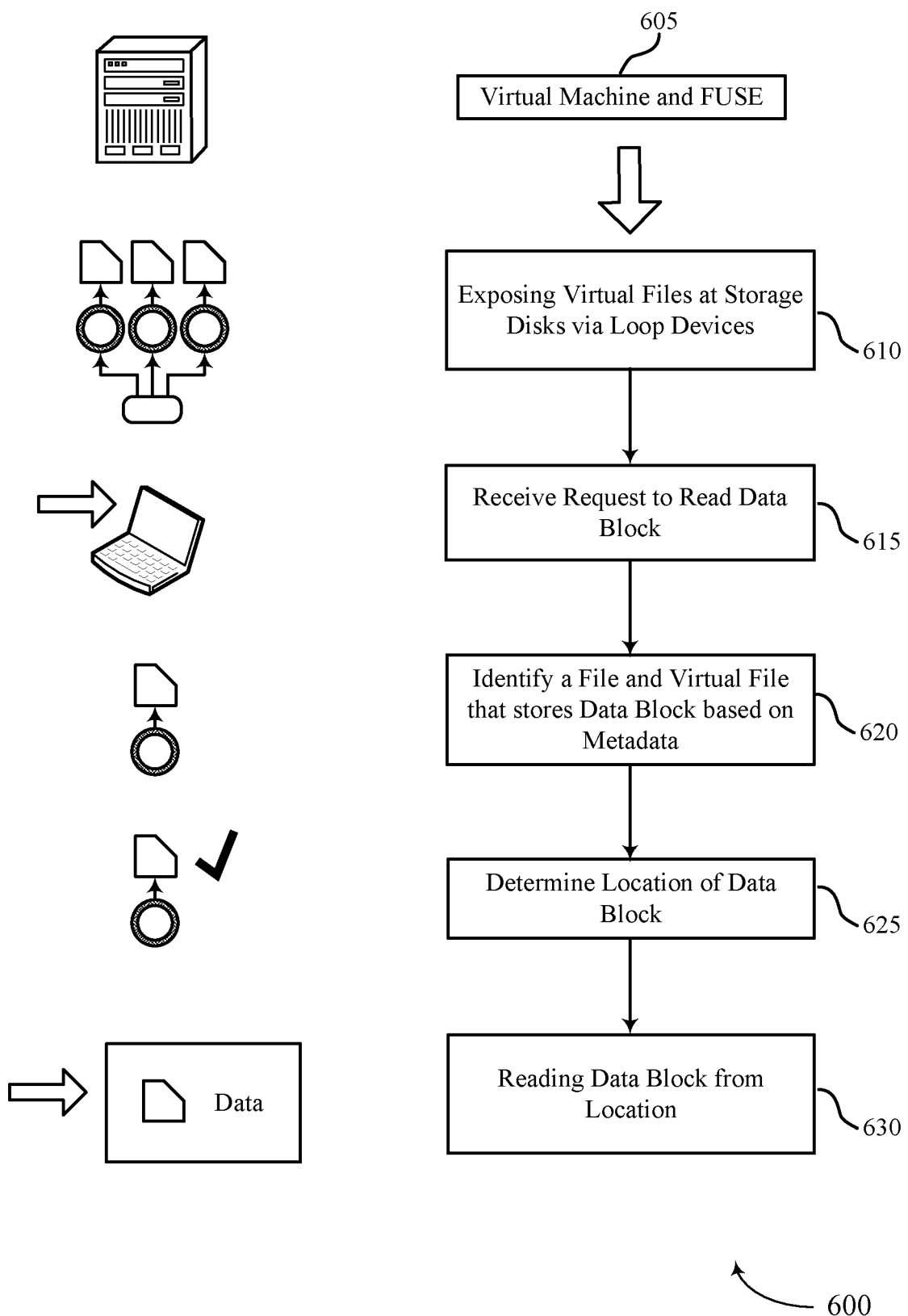
FIG. 6 illustrates an example of a process flow that supports efficient file recovery from tiered cloud snapshots in accordance with aspects of the present disclosure.

FIG. 6 illustrates an example of a process flow 600 that supports efficient file recovery from tiered cloud snapshots in accordance with aspects of the present disclosure. In some examples, various features of the process flow 600 may be implemented at or by a server 125, storage appliance 135, computing device 115, server 200, storage appliance 300, or any combination thereof as described with respect to FIGS. 1 through 3.

At 605, a filesystem may be mounted in a user space partition (e.g., a FUSE system) of virtual memory of a computing device. In some examples, the computing device may be running a VM which includes a set of storage disks that includes filesystem data of the VM, which may in some examples be stored in a cloud storage environment. The FUSE system may access information from the file system, a write cache, a cloud storage environment, or any combination thereof.

At 610, one or more virtual files may be exposed via the FUSE system. The one or more virtual files may be associated with one or more storage disks of the set of storage disks, and the one or more virtual files may further correspond to one or more loop devices configured to map files of the VM to one or more virtual files. The one or more loop devices may be configured per disk partition of the set of storage disks (e.g., one loop device per disk). In some examples, the FUSE system may be associated with one or more full backups of data of the VM, one or more incremental backups of data of the VM, or both.

At 615, the computing device may receive a request to read a data block that is stored at the VM. In some examples, the request to read the data block may be translated at the loop devices to a request to read the corresponding virtual file that stores the data block via the FUSE system.

In some examples, upon receiving the request to read the data block, the computing device may determine whether the data block is associated with one or more corresponding write processes in a data cache of the computing device, and if the data block corresponds to the one or more write processes, the computing device may write the data block to the data cache. In cases that the data block does not correspond to the one or more write processes, the computing device may perform a read process based on the absence of the one or more write processes in the data cache.

At 620, the file and corresponding virtual file that stores the data block may be identified based on a set of metadata received via the one or more loop devices. For example, the metadata may include file access information recorded by the computing device, timing information, file system creation information, file system modification information, or any combination thereof.

At 625, the location of the data block stored at the VM may be determined based on the identified file and virtual file that stores the data block. In some cases, the location of the corresponding virtual file that stores the data block may be identified based on an offset from another virtual file or based on a latest backup of the data. For example, the computing device may determine the latest backup of the data block based on a set of backup markers (e.g., backup fingerprints) that are indicative of one or more previous modifications of the data block. In some other examples, the latest backup of the data block may be a latest change in the data block from either a full disk backup of an incremental disk backup of the data block.

At 630, the data block may be read from the determined location. In some cases, the data block may be read from a given offset of a different virtual file or at an offset from a latest backup of the data block. In some cases, reading the data block from the determined location may include downloading the file and corresponding virtual file of the one or more virtual files that stores the data block, where the file and the corresponding virtual file correspond to a subset of virtual files stored on the VM. In some examples, a recovery operation may be performed on the data block upon reading the data block from the determined location.

Figure 7:
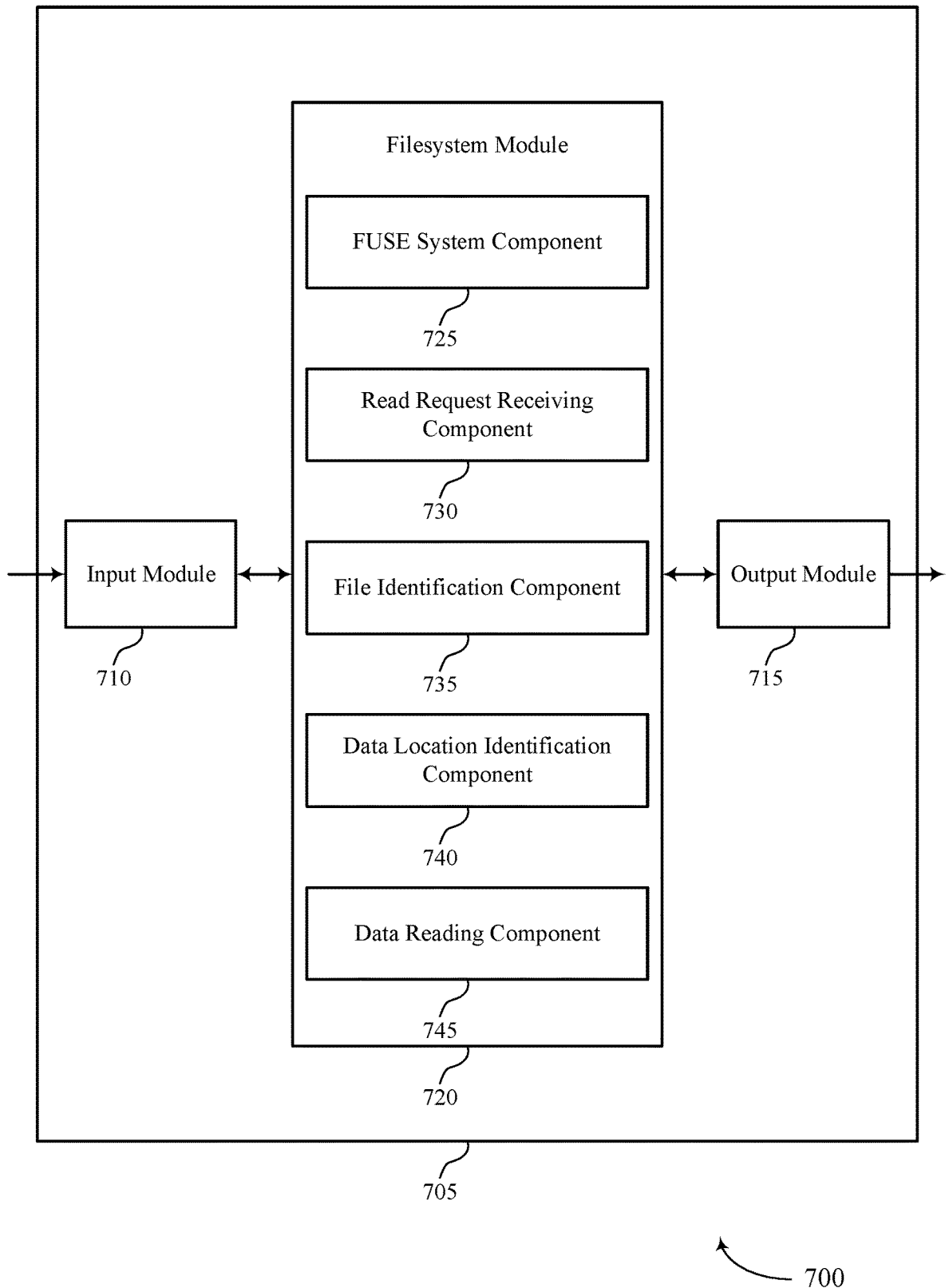
FIG. 7 shows a block diagram of an apparatus that supports efficient file recovery from tiered cloud snapshots in accordance with aspects of the present disclosure.

FIG. 7 shows a block diagram 700 of a device 705 that supports efficient file recovery from tiered cloud snapshots in accordance with aspects of the present disclosure. The device 705 may include an input module 710, an output module 715, and a filesystem controller 720. The device 705 may also include a processor. Each of these components may be in communication with one another (e.g., via one or more buses).

The input module 710 may manage input signals for the device 705. For example, the input module 710 may identify input signals based on an interaction with a modem, a keyboard, a mouse, a touchscreen, or a similar device. These input signals may be associated with user input or processing at other components or devices. In some cases, the input module 710 may utilize an operating system such as iOS®, ANDROID®, MS-DOS®, MS-WINDOWS®, OS/2®, UNIX®, LINUX®, or another known operating system to handle input signals. The input module 710 may send aspects of these input signals to other components of the device 705 for processing. For example, the input module 710 may transmit input signals to the filesystem controller 720 to support efficient file recovery from tiered cloud snapshots. In some cases, the input module 710 may be a component of an network interface 910 as described with reference to FIG. 9.

The output module 715 may manage output signals for the device 705. For example, the output module 715 may receive signals from other components of the device 705, such as the filesystem controller 720, and may transmit these signals to other components or devices. In some examples, the output module 715 may transmit output signals for display in a user interface, for storage in a database or data store, for further processing at a server or server cluster, or for any other processes at any number of devices or systems. In some cases, the output module 715 may be a component of an network interface 910 as described with reference to FIG. 9.

For example, the filesystem controller 720 may include a FUSE system component 725, a read request receiving component 730, a file identification component 735, a data location identification component 740, a data reading component 745, or any combination thereof. In some examples, the filesystem controller 720, or various components thereof, may be configured to perform various operations (e.g., receiving, monitoring, transmitting) using or otherwise in cooperation with the input module 710, the output module 715, or both. For example, the filesystem controller 720 may receive information from the input module 710, send information to the output module 715, or be integrated in combination with the input module 710, the output module 715, or both to receive information, transmit information, or perform various other operations as described herein.

The FUSE system component 725 may be configured as or otherwise support a means for mounting a file system in a user space partition of virtual memory of a computing device, the computing device running a virtual machine that includes a set of storage disks. The FUSE system component 725 may be configured as or otherwise support a means for exposing, based on the file system, one or more virtual files associated with one or more storage disks of the set of storage disks, where the one or more virtual files correspond to one or more loop devices configured to map files of the virtual machine to the one or more virtual files. The read request receiving component 730 may be configured as or otherwise support a means for receiving a request to read a data block stored at the virtual machine. The file identification component 735 may be configured as or otherwise support a means for identifying, based on a set of metadata received via the one or more loop devices, a file and corresponding virtual file of the one or more virtual files that stores the data block. The data location identification component 740 may be configured as or otherwise support a means for determining a location of the data block stored at the virtual machine based on the identifying. The data reading component 745 may be configured as or otherwise support a means for reading the data block from the determined location.

Figure 8:
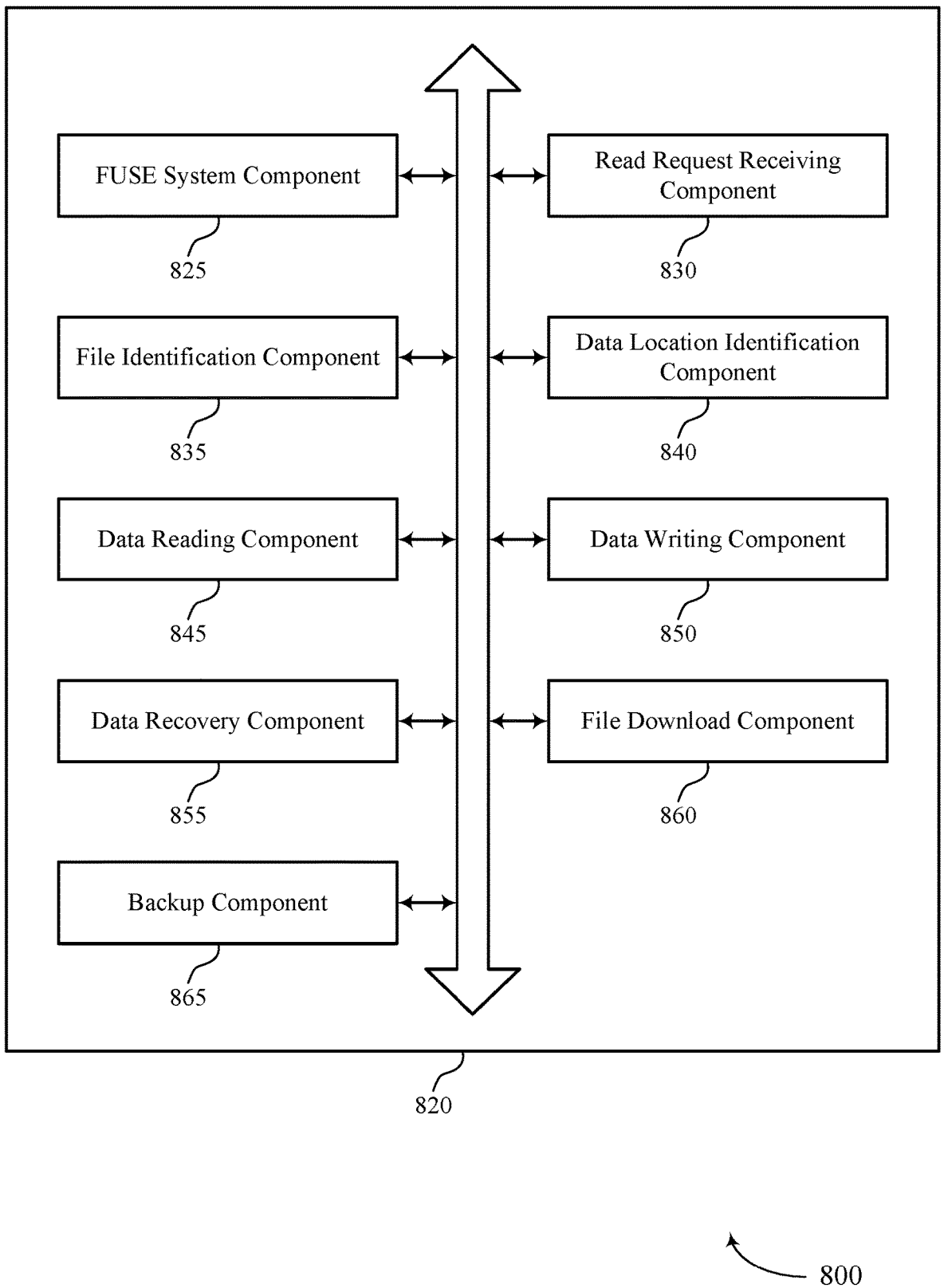
FIG. 8 shows a block diagram of a filesystem controller that supports efficient file recovery from tiered cloud snapshots in accordance with aspects of the present disclosure.

FIG. 8 shows a block diagram 800 of a filesystem controller 820 that supports efficient file recovery from tiered cloud snapshots in accordance with aspects of the present disclosure. The filesystem controller 820 may be an example of aspects of a filesystem controller or a filesystem controller 720, or both, as described herein. The filesystem controller 820, or various components thereof, may be an example of means for performing various aspects of efficient file recovery from tiered cloud snapshots as described herein. For example, the filesystem controller 820 may include a FUSE system component 825, a read request receiving component 830, a file identification component 835, a data location identification component 840, a data reading component 845, a data writing component 850, a data recovery component 855, a file download component 860, a backup component 865, or any combination thereof. Each of these components may communicate, directly or indirectly, with one another (e.g., via one or more buses).

The FUSE system component 825 may be configured as or otherwise support a means for mounting a file system in a user space partition of virtual memory of a computing device, the computing device running a virtual machine that includes a set of storage disks. In some examples, the FUSE system component 825 may be configured as or otherwise support a means for exposing, based on the file system, one or more virtual files associated with one or more storage disks of the set of storage disks, where the one or more virtual files correspond to one or more loop devices configured to map files of the virtual machine to the one or more virtual files. The read request receiving component 830 may be configured as or otherwise support a means for receiving a request to read a data block stored at the virtual machine. The file identification component 835 may be configured as or otherwise support a means for identifying, based on a set of metadata received via the one or more loop devices, a file and corresponding virtual file of the one or more virtual files that stores the data block. The data location identification component 840 may be configured as or otherwise support a means for determining a location of the data block stored at the virtual machine based on the identifying. The data reading component 845 may be configured as or otherwise support a means for reading the data block from the determined location.

In some examples, the file system in user space is associated with one or more full backups, and the data location identification component 840 may be configured as or otherwise support a means for identifying the location of the corresponding virtual file that stores the data block at an offset from a virtual file of the one or more virtual files in accordance with the file system in user space. In some examples, the file system in user space is associated with one or more full backups, and the data reading component 845 may be configured as or otherwise support a means for reading, at the offset, the data block from a latest backup of the data block based on the identifying.

In some examples, the backup component 865 may be configured as or otherwise support a means for determining the latest backup of the data block based on a set of backup markers indicative of one or more previous modifications of the data block.

In some examples, the latest backup of the data block includes a change in the data block from either a full disk backup or an incremental disk backup of the data block.

In some examples, the data writing component 850 may be configured as or otherwise support a means for determine whether the data block is associated with one or more corresponding write processes in a data cache of the computing device. In some examples, the data writing component 850 may be configured as or otherwise support a means for writing the data block to the data cache in accordance with the one or more corresponding write processes.

In some examples, the data writing component 850 may be configured as or otherwise support a means for determining that the data block is associated with an absence of one or more write processes in the data cache of the computing device. In some examples, the data reading component 845 may be configured as or otherwise support a means for reading the data block from the determined location based on the absence of the one or more write processes in the data cache.

In some examples, the FUSE system component 825 may be configured as or otherwise support a means for translating the request to read the data block stored at the virtual machine from the one or more loop devices to a request to read the corresponding virtual file that stores the data block at the mounted file system in user space partition.

In some examples, to support reading the data block from the determined location, the data recovery component 855 may be configured as or otherwise support a means for performing a recovery operation on the data block based on one or more snapshots of the data block identified from the reading.

In some examples, the set of metadata received via the one or more loop devices includes file access information recorded by the computing device, timing information, file system creation information, file system modification information, or any combination thereof.

In some examples, the file system in the user space partition of virtual memory of the computing device accesses information from the file system, a write cache, a cloud storage environment, or any combination thereof.

In some examples, to support reading the data block from the determined location, the file download component 860 may be configured as or otherwise support a means for downloading the file and corresponding virtual file of the one or more virtual files that stores the data block, where the file and the corresponding virtual file include a subset of virtual files stored on the virtual machine.

In some examples, the one or more loop devices are configured per disk partition of the set of storage disks.

In some examples, the one or more virtual files are stored on the one or more storage disks in a cloud storage environment.

In some examples, the data block includes recoverable information present on the virtual machine.

Figure 9:
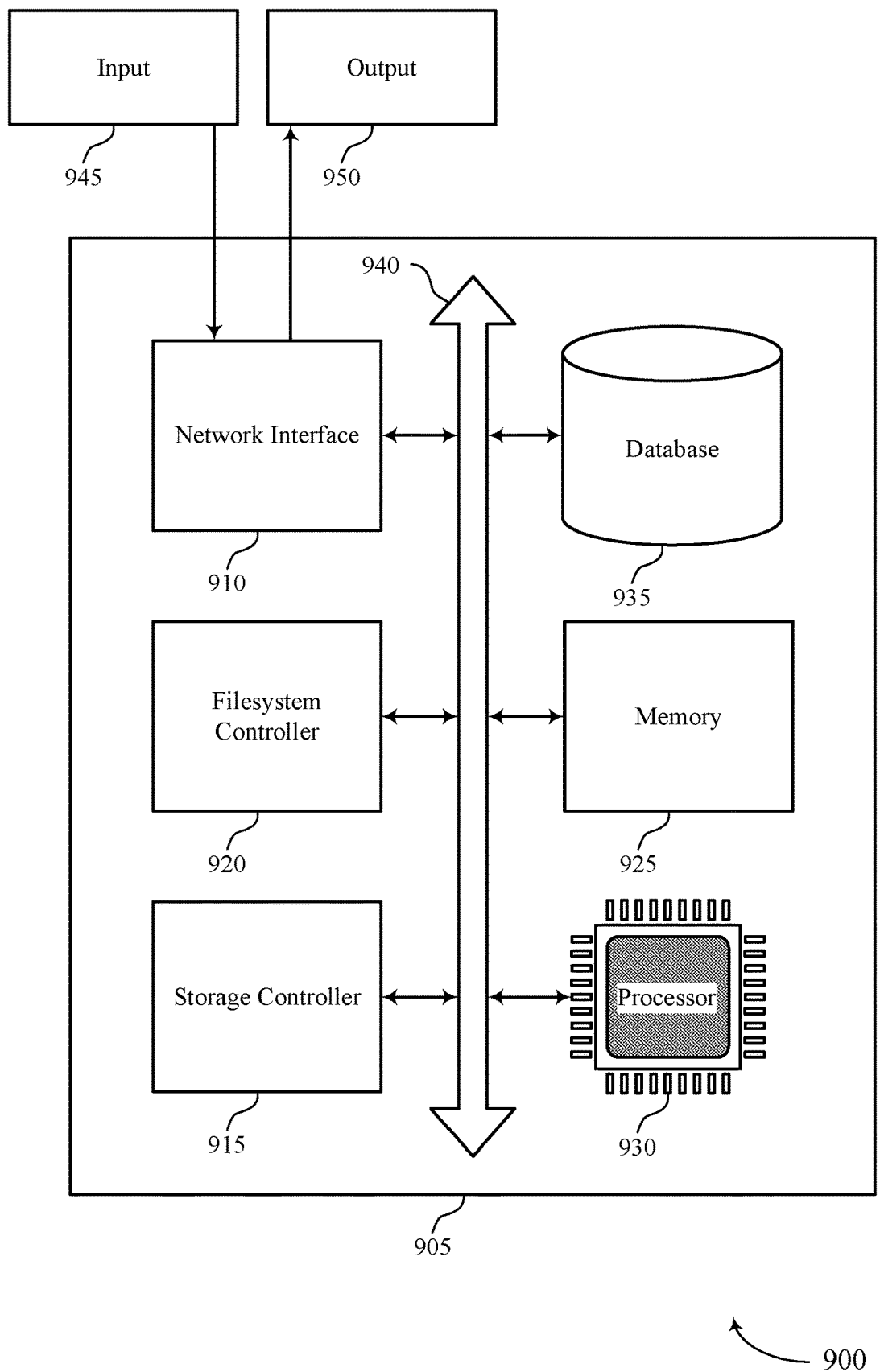
FIG. 9 shows a diagram of a system including a device that supports efficient file recovery from tiered cloud snapshots in accordance with aspects of the present disclosure.

FIG. 9 shows a diagram of a system 900 including a device 905 that supports efficient file recovery from tiered cloud snapshots in accordance with aspects of the present disclosure. The device 905 may be an example of or include the components of a device 705 as described herein. The device 905 may include components for bi-directional data communications including components for transmitting and receiving communications, such as a filesystem controller 920, an network interface 910, a storage controller 915, a memory 925, a processor 930, and a database 935. These components may be in electronic communication or otherwise coupled (e.g., operatively, communicatively, functionally, electronically, electrically) via one or more buses (e.g., a bus 940).

The network interface 910 may manage input signals 945 and output signals 950 for the device 905. The network interface 910 may also manage peripherals not integrated into the device 905. In some cases, the network interface 910 may represent a physical connection or port to an external peripheral. In some cases, the network interface 910 may utilize an operating system such as iOS®, ANDROID®, MS-DOS®, MS-WINDOWS®, OS/2®, UNIX®, LINUX®, or another known operating system. In other cases, the network interface 910 may represent or interact with a modem, a keyboard, a mouse, a touchscreen, or a similar device. In some cases, the network interface 910 may be implemented as part of a processor 930. In some examples, a user may interact with the device 905 via the network interface 910 or via hardware components controlled by the network interface 910.

The storage controller 915 may manage data storage and processing in a database 935. In some cases, a user may interact with the storage controller 915. In other cases, the storage controller 915 may operate automatically without user interaction. The database 935 may be an example of a single database, a distributed database, multiple distributed databases, a data store, a data lake, or an emergency backup database.

Memory 925 may include random-access memory (RAM) and ROM. The memory 925 may store computer-readable, computer-executable software including instructions that, when executed, cause the processor 930 to perform various functions described herein. In some cases, the memory 925 may contain, among other things, a BIOS which may control basic hardware or software operation such as the interaction with peripheral components or devices.

The processor 930 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 930 may be configured to operate a memory array using a memory controller. In other cases, a memory controller may be integrated into the processor 930. The processor 930 may be configured to execute computer-readable instructions stored in a memory 925 to perform various functions (e.g., functions or tasks supporting efficient file recovery from tiered cloud snapshots).

For example, the filesystem controller 920 may be configured as or otherwise support a means for mounting a file system in a user space partition of virtual memory of a computing device, the computing device running a virtual machine that includes a set of storage disks. The filesystem controller 920 may be configured as or otherwise support a means for exposing, based on the file system, one or more virtual files associated with one or more storage disks of the set of storage disks, where the one or more virtual files correspond to one or more loop devices configured to map files of the virtual machine to the one or more virtual files. The filesystem controller 920 may be configured as or otherwise support a means for receiving a request to read a data block stored at the virtual machine. The filesystem controller 920 may be configured as or otherwise support a means for identifying, based on a set of metadata received via the one or more loop devices, a file and corresponding virtual file of the one or more virtual files that stores the data block. The filesystem controller 920 may be configured as or otherwise support a means for determining a location of the data block stored at the virtual machine based on the identifying. The filesystem controller 920 may be configured as or otherwise support a means for reading the data block from the determined location.

By including or configuring the filesystem controller 920 in accordance with examples as described herein, the device 905 may support techniques for reduced latency for data recovery, improved user experience related to reduced data download times, increased efficiency and selectivity for data backup, more efficient utilization of resources, and reduced cost.

Figure 10:
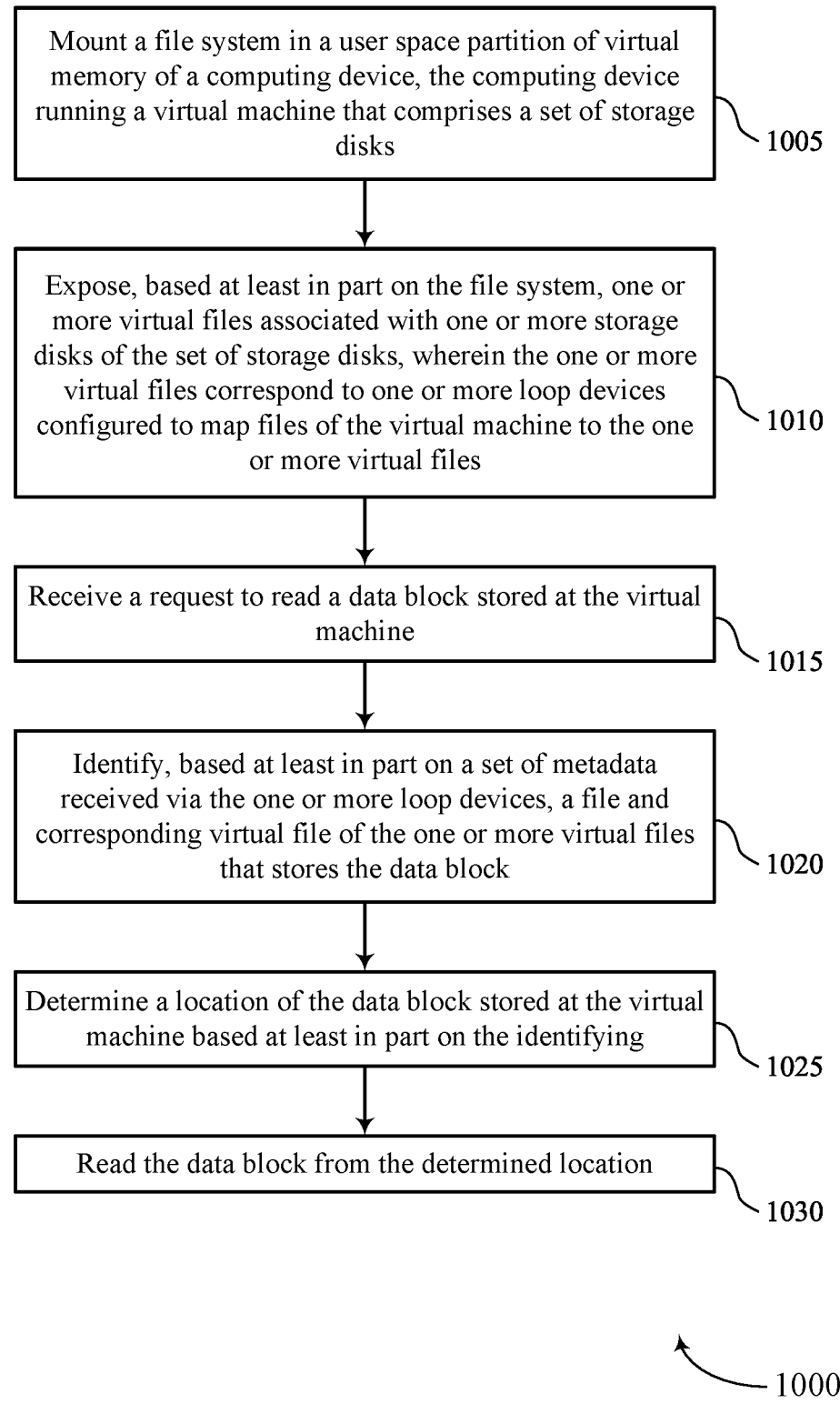
FIGS. 10 through 13 show flowcharts illustrating methods that support efficient file recovery from tiered cloud snapshots in accordance with aspects of the present disclosure.

FIG. 10 shows a flowchart illustrating a method 1000 that supports efficient file recovery from tiered cloud snapshots in accordance with aspects of the present disclosure. The operations of the method 1000 may be implemented by a computing device or its components as described herein. For example, the operations of the method 1000 may be performed by a server, storage appliance, or computing device as described with reference to FIGS. 1 through 9. In some examples, a computing device may execute a set of instructions to control the functional elements of the computing device to perform the described functions. Additionally, or alternatively, the computing device may perform aspects of the described functions using special-purpose hardware.

At 1005, the method may include mounting a file system in a user space partition of virtual memory of a computing device, the computing device running a virtual machine that includes a set of storage disks. The operations of 1005 may be performed in accordance with examples as disclosed herein. In some examples, aspects of the operations of 1005 may be performed by a FUSE system component 825 as described with reference to FIG. 8.

At 1010, the method may include exposing, based on the file system, one or more virtual files associated with one or more storage disks of the set of storage disks, where the one or more virtual files correspond to one or more loop devices configured to map files of the virtual machine to the one or more virtual files. The operations of 1010 may be performed in accordance with examples as disclosed herein. In some examples, aspects of the operations of 1010 may be performed by a FUSE system component 825 as described with reference to FIG. 8.

At 1015, the method may include receiving a request to read a data block stored at the virtual machine. The operations of 1015 may be performed in accordance with examples as disclosed herein. In some examples, aspects of the operations of 1015 may be performed by a read request receiving component 830 as described with reference to FIG. 8.

At 1020, the method may include identifying, based on a set of metadata received via the one or more loop devices, a file and corresponding virtual file of the one or more virtual files that stores the data block. The operations of 1020 may be performed in accordance with examples as disclosed herein. In some examples, aspects of the operations of 1020 may be performed by a file identification component 835 as described with reference to FIG. 8.

At 1025, the method may include determining a location of the data block stored at the virtual machine based on the identifying. The operations of 1025 may be performed in accordance with examples as disclosed herein. In some examples, aspects of the operations of 1025 may be performed by a data location identification component 840 as described with reference to FIG. 8.

At 1030, the method may include reading the data block from the determined location. The operations of 1030 may be performed in accordance with examples as disclosed herein. In some examples, aspects of the operations of 1030 may be performed by a data reading component 845 as described with reference to FIG. 8.

Figure 11:
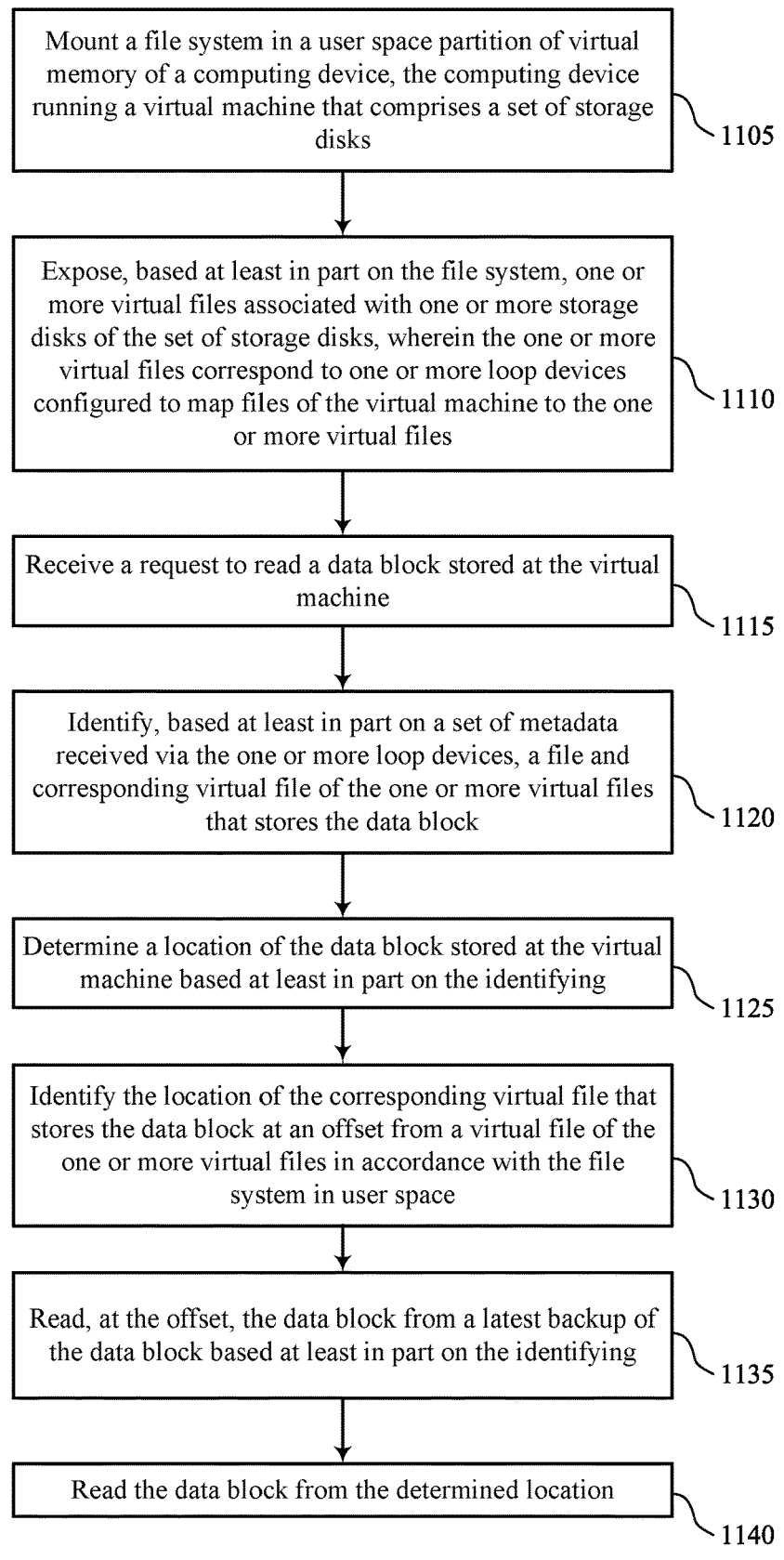

FIG. 11 shows a flowchart illustrating a method 1100 that supports efficient file recovery from tiered cloud snapshots in accordance with aspects of the present disclosure. The operations of the method 1100 may be implemented by a computing device or its components as described herein. For example, the operations of the method 1100 may be performed by a server, storage appliance, or computing device as described with reference to FIGS. 1 through 9. In some examples, a computing device may execute a set of instructions to control the functional elements of the computing device to perform the described functions. Additionally, or alternatively, the computing device may perform aspects of the described functions using special-purpose hardware.

At 1105, the method may include mounting a file system in a user space partition of virtual memory of a computing device, the computing device running a virtual machine that includes a set of storage disks. The operations of 1105 may be performed in accordance with examples as disclosed herein. In some examples, aspects of the operations of 1105 may be performed by a FUSE system component 825 as described with reference to FIG. 8.

At 1110, the method may include exposing, based on the file system, one or more virtual files associated with one or more storage disks of the set of storage disks, where the one or more virtual files correspond to one or more loop devices configured to map files of the virtual machine to the one or more virtual files. The operations of 1110 may be performed in accordance with examples as disclosed herein. In some examples, aspects of the operations of 1110 may be performed by a FUSE system component 825 as described with reference to FIG. 8.

At 1115, the method may include receiving a request to read a data block stored at the virtual machine. The operations of 1115 may be performed in accordance with examples as disclosed herein. In some examples, aspects of the operations of 1115 may be performed by a read request receiving component 830 as described with reference to FIG. 8.

At 1120, the method may include identifying, based on a set of metadata received via the one or more loop devices, a file and corresponding virtual file of the one or more virtual files that stores the data block. The operations of 1120 may be performed in accordance with examples as disclosed herein. In some examples, aspects of the operations of 1120 may be performed by a file identification component 835 as described with reference to FIG. 8.

At 1125, the method may include determining a location of the data block stored at the virtual machine based on the identifying. The operations of 1125 may be performed in accordance with examples as disclosed herein. In some examples, aspects of the operations of 1125 may be performed by a data location identification component 840 as described with reference to FIG. 8.

At 1130, the method may include identifying the location of the corresponding virtual file that stores the data block at an offset from a virtual file of the one or more virtual files in accordance with the file system in user space. The operations of 1130 may be performed in accordance with examples as disclosed herein. In some examples, aspects of the operations of 1130 may be performed by a data location identification component 840 as described with reference to FIG. 8.

At 1135, the method may include reading, at the offset, the data block from a latest backup of the data block based on the identifying. The operations of 1135 may be performed in accordance with examples as disclosed herein. In some examples, aspects of the operations of 1135 may be performed by a data reading component 845 as described with reference to FIG. 8.

At 1140, the method may include reading the data block from the determined location. The operations of 1140 may be performed in accordance with examples as disclosed herein. In some examples, aspects of the operations of 1140 may be performed by a data reading component 845 as described with reference to FIG. 8.

Figure 12:
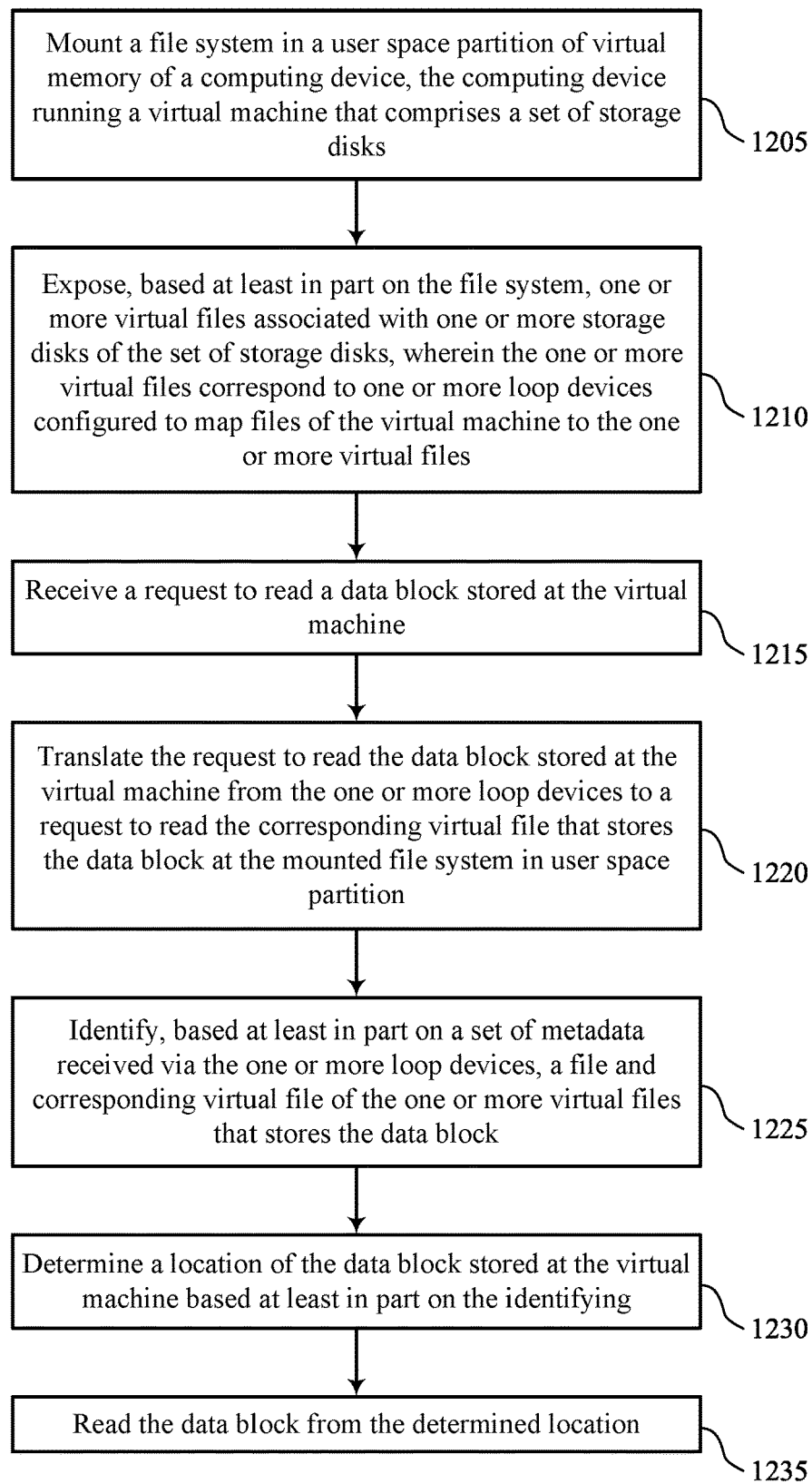

FIG. 12 shows a flowchart illustrating a method 1200 that supports efficient file recovery from tiered cloud snapshots in accordance with aspects of the present disclosure. The operations of the method 1200 may be implemented by a computing device or its components as described herein. For example, the operations of the method 1200 may be performed by a server, storage appliance, or computing device as described with reference to FIGS. 1 through 9. In some examples, a computing device may execute a set of instructions to control the functional elements of the computing device to perform the described functions. Additionally, or alternatively, the computing device may perform aspects of the described functions using special-purpose hardware.

At 1205, the method may include mounting a file system in a user space partition of virtual memory of a computing device, the computing device running a virtual machine that includes a set of storage disks. The operations of 1205 may be performed in accordance with examples as disclosed herein. In some examples, aspects of the operations of 1205 may be performed by a FUSE system component 825 as described with reference to FIG. 8.

At 1210, the method may include exposing, based on the file system, one or more virtual files associated with one or more storage disks of the set of storage disks, where the one or more virtual files correspond to one or more loop devices configured to map files of the virtual machine to the one or more virtual files. The operations of 1210 may be performed in accordance with examples as disclosed herein. In some examples, aspects of the operations of 1210 may be performed by a FUSE system component 825 as described with reference to FIG. 8.

At 1215, the method may include receiving a request to read a data block stored at the virtual machine. The operations of 1215 may be performed in accordance with examples as disclosed herein. In some examples, aspects of the operations of 1215 may be performed by a read request receiving component 830 as described with reference to FIG. 8.

At 1220, the method may include translating the request to read the data block stored at the virtual machine from the one or more loop devices to a request to read the corresponding virtual file that stores the data block at the mounted file system in user space partition. The operations of 1220 may be performed in accordance with examples as disclosed herein. In some examples, aspects of the operations of 1220 may be performed by a FUSE system component 825 as described with reference to FIG. 8.

At 1225, the method may include identifying, based on a set of metadata received via the one or more loop devices, a file and corresponding virtual file of the one or more virtual files that stores the data block. The operations of 1225 may be performed in accordance with examples as disclosed herein. In some examples, aspects of the operations of 1225 may be performed by a file identification component 835 as described with reference to FIG. 8.

At 1230, the method may include determining a location of the data block stored at the virtual machine based on the identifying. The operations of 1230 may be performed in accordance with examples as disclosed herein. In some examples, aspects of the operations of 1230 may be performed by a data location identification component 840 as described with reference to FIG. 8.

At 1235, the method may include reading the data block from the determined location. The operations of 1235 may be performed in accordance with examples as disclosed herein. In some examples, aspects of the operations of 1235 may be performed by a data reading component 845 as described with reference to FIG. 8.

Figure 13:
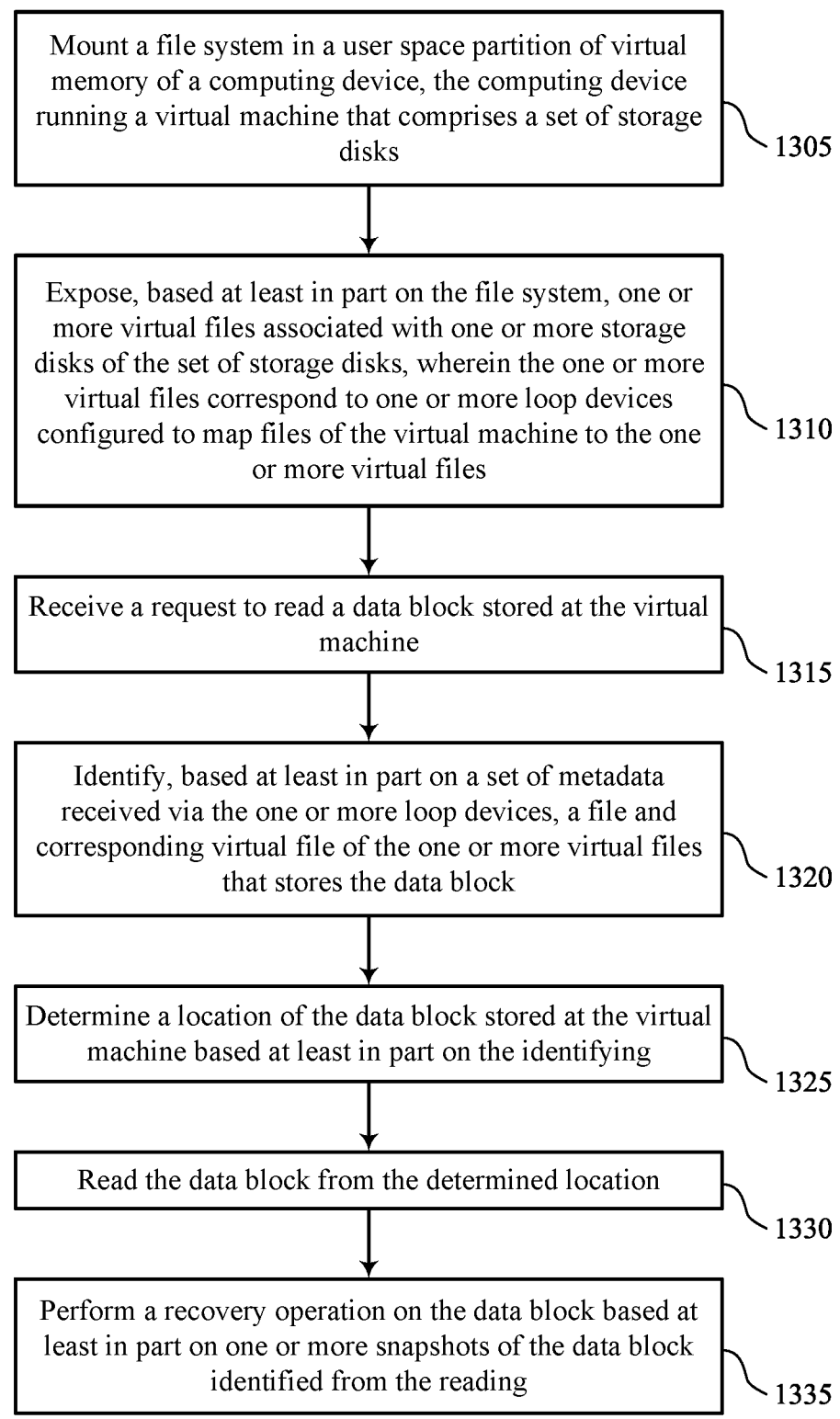

FIG. 13 shows a flowchart illustrating a method 1300 that supports efficient file recovery from tiered cloud snapshots in accordance with aspects of the present disclosure. The operations of the method 1300 may be implemented by a computing device or its components as described herein. For example, the operations of the method 1300 may be performed by a server, storage appliance, or computing device as described with reference to FIGS. 1 through 9. In some examples, a computing device may execute a set of instructions to control the functional elements of the computing device to perform the described functions. Additionally, or alternatively, the computing device may perform aspects of the described functions using special-purpose hardware.

At 1305, the method may include mounting a file system in a user space partition of virtual memory of a computing device, the computing device running a virtual machine that includes a set of storage disks. The operations of 1305 may be performed in accordance with examples as disclosed herein. In some examples, aspects of the operations of 1305 may be performed by a FUSE system component 825 as described with reference to FIG. 8.

At 1310, the method may include exposing, based on the file system, one or more virtual files associated with one or more storage disks of the set of storage disks, where the one or more virtual files correspond to one or more loop devices configured to map files of the virtual machine to the one or more virtual files. The operations of 1310 may be performed in accordance with examples as disclosed herein. In some examples, aspects of the operations of 1310 may be performed by a FUSE system component 825 as described with reference to FIG. 8.

At 1315, the method may include receiving a request to read a data block stored at the virtual machine. The operations of 1315 may be performed in accordance with examples as disclosed herein. In some examples, aspects of the operations of 1315 may be performed by a read request receiving component 830 as described with reference to FIG. 8.

At 1320, the method may include identifying, based on a set of metadata received via the one or more loop devices, a file and corresponding virtual file of the one or more virtual files that stores the data block. The operations of 1320 may be performed in accordance with examples as disclosed herein. In some examples, aspects of the operations of 1320 may be performed by a file identification component 835 as described with reference to FIG. 8.

At 1325, the method may include determining a location of the data block stored at the virtual machine based on the identifying. The operations of 1325 may be performed in accordance with examples as disclosed herein. In some examples, aspects of the operations of 1325 may be performed by a data location identification component 840 as described with reference to FIG. 8.

At 1330, the method may include reading the data block from the determined location. The operations of 1330 may be performed in accordance with examples as disclosed herein. In some examples, aspects of the operations of 1330 may be performed by a data reading component 845 as described with reference to FIG. 8.

At 1335, the method may include performing a recovery operation on the data block based on one or more snapshots of the data block identified from the reading. The operations of 1335 may be performed in accordance with examples as disclosed herein. In some examples, aspects of the operations of 1335 may be performed by a data recovery component 855 as described with reference to FIG. 8.

A method is described. The method may include mounting a file system in a user space partition of virtual memory of a computing device, the computing device running a virtual machine that includes a set of storage disks, exposing, based on the file system, one or more virtual files associated with one or more storage disks of the set of storage disks, where the one or more virtual files correspond to one or more loop devices configured to map files of the virtual machine to the one or more virtual files, receiving a request to read a data block stored at the virtual machine, identifying, based on a set of metadata received via the one or more loop devices, a file and corresponding virtual file of the one or more virtual files that stores the data block, determining a location of the data block stored at the virtual machine based on the identifying, and reading the data block from the determined location.

An apparatus is described. The apparatus may include a processor, memory coupled with the processor, and instructions stored in the memory. The instructions may be executable by the processor to cause the apparatus to mount a file system in a user space partition of virtual memory of a computing device, the computing device running a virtual machine that includes a set of storage disks, expose, based on the file system, one or more virtual files associated with one or more storage disks of the set of storage disks, where the one or more virtual files correspond to one or more loop devices configured to map files of the virtual machine to the one or more virtual files, receive a request to read a data block stored at the virtual machine, identify, based on a set of metadata received via the one or more loop devices, a file and corresponding virtual file of the one or more virtual files that stores the data block, determine a location of the data block stored at the virtual machine based on the identifying, and read the data block from the determined location.

Another apparatus is described. The apparatus may include means for mounting a file system in a user space partition of virtual memory of a computing device, the computing device running a virtual machine that includes a set of storage disks, means for exposing, based on the file system, one or more virtual files associated with one or more storage disks of the set of storage disks, where the one or more virtual files correspond to one or more loop devices configured to map files of the virtual machine to the one or more virtual files, means for receiving a request to read a data block stored at the virtual machine, means for identifying, based on a set of metadata received via the one or more loop devices, a file and corresponding virtual file of the one or more virtual files that stores the data block, means for determining a location of the data block stored at the virtual machine based on the identifying, and means for reading the data block from the determined location.

A non-transitory computer-readable medium storing code is described. The code may include instructions executable by a processor to mount a file system in a user space partition of virtual memory of a computing device, the computing device running a virtual machine that includes a set of storage disks, expose, based on the file system, one or more virtual files associated with one or more storage disks of the set of storage disks, where the one or more virtual files correspond to one or more loop devices configured to map files of the virtual machine to the one or more virtual files, receive a request to read a data block stored at the virtual machine, identify, based on a set of metadata received via the one or more loop devices, a file and corresponding virtual file of the one or more virtual files that stores the data block, determine a location of the data block stored at the virtual machine based on the identifying, and read the data block from the determined location.

In some examples of the method, apparatuses, and non-transitory computer-readable medium described herein, the file system in user space may be associated with one or more full backups and the method, apparatuses, and non-transitory computer-readable medium may include further operations, features, means, or instructions for identifying the location of the corresponding virtual file that stores the data block at an offset from a virtual file of the one or more virtual files in accordance with the file system in user space and reading, at the offset, the data block from a latest backup of the data block based on the identifying.

Some examples of the method, apparatuses, and non-transitory computer-readable medium described herein may further include operations, features, means, or instructions for determining the latest backup of the data block based on a set of backup markers indicative of one or more previous modifications of the data block.

In some examples of the method, apparatuses, and non-transitory computer-readable medium described herein, the latest backup of the data block includes a change in the data block from either a full disk backup or an incremental disk backup of the data block.

Some examples of the method, apparatuses, and non-transitory computer-readable medium described herein may further include operations, features, means, or instructions for determine whether the data block may be associated with one or more corresponding write processes in a data cache of the computing device and writing the data block to the data cache in accordance with the one or more corresponding write processes.

Some examples of the method, apparatuses, and non-transitory computer-readable medium described herein may further include operations, features, means, or instructions for determining that the data block may be associated with an absence of one or more write processes in the data cache of the computing device and reading the data block from the determined location based on the absence of the one or more write processes in the data cache.

Some examples of the method, apparatuses, and non-transitory computer-readable medium described herein may further include operations, features, means, or instructions for translating the request to read the data block stored at the virtual machine from the one or more loop devices to a request to read the corresponding virtual file that stores the data block at the mounted file system in user space partition.

In some examples of the method, apparatuses, and non-transitory computer-readable medium described herein, reading the data block from the determined location may include operations, features, means, or instructions for performing a recovery operation on the data block based on one or more snapshots of the data block identified from the reading.

In some examples of the method, apparatuses, and non-transitory computer-readable medium described herein, the set of metadata received via the one or more loop devices includes file access information recorded by the computing device, timing information, file system creation information, file system modification information, or any combination thereof.

In some examples of the method, apparatuses, and non-transitory computer-readable medium described herein, the file system in the user space partition of virtual memory of the computing device accesses information from the file system, a write cache, a cloud storage environment, or any combination thereof.

In some examples of the method, apparatuses, and non-transitory computer-readable medium described herein, reading the data block from the determined location may include operations, features, means, or instructions for downloading the file and corresponding virtual file of the one or more virtual files that stores the data block, where the file and the corresponding virtual file include a subset of virtual files stored on the virtual machine.

In some examples of the method, apparatuses, and non-transitory computer-readable medium described herein, the one or more loop devices may be configured per disk partition of the set of storage disks.

In some examples of the method, apparatuses, and non-transitory computer-readable medium described herein, the one or more virtual files may be stored on the one or more storage disks in a cloud storage environment.

In some examples of the method, apparatuses, and non-transitory computer-readable medium described herein, the data block includes recoverable information present on the virtual machine.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
    mounting a file system in a user space partition of virtual memory of a computing device, the computing device running a virtual machine that comprises a set of storage disks;
    exposing, based at least in part on the file system, one or more virtual files associated with one or more storage disks of the set of storage disks, wherein the one or more virtual files correspond to one or more loop devices configured to map files of the virtual machine to the one or more virtual files;

receiving a request to read a data block stored at the virtual machine;

identifying, based at least in part on a set of metadata received via the one or more loop devices, a file and a corresponding virtual file of the one or more virtual files that stores the data block;

determining a location of the data block stored at the virtual machine based at least in part on identifying the file and the corresponding virtual file;

reading the data block from the determined location; and downloading the file and the corresponding virtual file of the one or more virtual files that stores the data block, wherein the file and the corresponding virtual file comprise at least a subset of virtual files stored on the virtual machine.

2. The method of claim 1, wherein the file system in user space is associated with one or more full backups, incremental backups, or both, of the virtual machine, the method further comprising:

identifying the location of the corresponding virtual file that stores the data block at an offset from a virtual file of the one or more virtual files in accordance with the file system in user space; and reading, at the offset, the data block from a latest backup of the data block based at least in part on identifying the location of the corresponding virtual file.

3. The method of claim 2, further comprising:

determining the latest backup of the data block based at least in part on a set of backup markers indicative of one or more previous modifications of the data block.

4. The method of claim 2, wherein the latest backup of the data block comprises a change in the data block from either a full disk backup or an incremental disk backup of the data block.

5. The method of claim 1, further comprising:

determine whether the data block is associated with one or more corresponding write processes in a data cache of the computing device; and writing the data block to the data cache in accordance with the one or more corresponding write processes.

6. The method of claim 5, further comprising:

determining that the data block is associated with an absence of one or more write processes in the data cache of the computing device; and reading the data block from the determined location based at least in part on the absence of the one or more write processes in the data cache.

7. The method of claim 1, further comprising:

translating the request to read the data block stored at the virtual machine from the one or more loop devices to a corresponding request to read the corresponding virtual file that stores the data block at the mounted file system in user space partition.

8. The method of claim 1, wherein reading the data block from the determined location further comprises:

performing a recovery operation on the data block based at least in part on one or more snapshots of the data block identified from reading the data block.

9. The method of claim 1, wherein the set of metadata received via the one or more loop devices comprises file access information recorded by the computing device, timing information, file system creation information, file system modification information, or any combination thereof.

10. The method of claim 1, wherein the file system in the user space partition of virtual memory of the computing device accesses information from the file system, a write cache, a cloud storage environment, or any combination thereof.

11. The method of claim 1, wherein the one or more loop devices are configured per disk partition of the set of storage disks.

12. The method of claim 1, wherein the one or more virtual files are stored on the one or more storage disks in a cloud storage environment.

13. The method of claim 1, wherein the data block comprises recoverable information present on the virtual machine.

14. An apparatus, comprising:

a processor;

memory coupled with the processor; and instructions stored in the memory and executable by the processor to cause the apparatus to:

mount a file system in a user space partition of virtual memory of a computing device, the computing device running a virtual machine that comprises a set of storage disks;

expose, based at least in part on the file system, one or more virtual files associated with one or more storage disks of the set of storage disks, wherein the one or more virtual files correspond to one or more loop devices configured to map files of the virtual machine to the one or more virtual files;

receive a request to read a data block stored at the virtual machine;

identify, based at least in part on a set of metadata received via the one or more loop devices, a file and a corresponding virtual file of the one or more virtual files that stores the data block;

determine a location of the data block stored at the virtual machine based at least in part on identifying the file and the corresponding virtual file;

read the data block from the determined location; and download the file and the corresponding virtual file of the one or more virtual files that stores the data block, wherein the file and the corresponding virtual file comprise at least a subset of virtual files stored on the virtual machine.

15. The apparatus of claim 14, wherein the file system in user space is associated with one or more full backups, and the instructions are further executable by the processor to cause the apparatus to:

identify the location of the corresponding virtual file that stores the data block at an offset from a virtual file of the one or more virtual files in accordance with the file system in user space; and read, at the offset, the data block from a latest backup of the data block based at least in part on identifying the location of the corresponding virtual file.

16. The apparatus of claim 15, wherein the instructions are further executable by the processor to cause the apparatus to:

determine the latest backup of the data block based at least in part on a set of backup markers indicative of one or more previous modifications of the data block.

17. The apparatus of claim 15, wherein the latest backup of the data block comprises a change in the data block from either a full disk backup or an incremental disk backup of the data block.

18. The apparatus of claim 14, wherein the instructions are further executable by the processor to cause the apparatus to:

determine whether the data block is associated with one or more corresponding write processes in a data cache of the computing device; and write the data block to the data cache in accordance with the one or more corresponding write processes.

19. A non-transitory computer-readable medium storing code, the code comprising instructions executable by a processor to:

mount a file system in a user space partition of virtual memory of a computing device, the computing device running a virtual machine that comprises a set of storage disks;

expose, based at least in part on the file system, one or more virtual files associated with one or more storage disks of the set of storage disks, wherein the one or more virtual files correspond to one or more loop devices configured to map files of the virtual machine to the one or more virtual files;

receive a request to read a data block stored at the virtual machine;

identify, based at least in part on a set of metadata received via the one or more loop devices, a file and a corresponding virtual file of the one or more virtual files that stores the data block;

determine a location of the data block stored at the virtual machine based at least in part on identifying the file and the corresponding virtual file;

read the data block from the determined location; and download the file and the corresponding virtual file of the one or more virtual files that stores the data block, wherein the file and the corresponding virtual file comprise at least a subset of virtual files stored on the virtual machine.

\* \* \* \* \*